(12) United States Patent
Vejnar

(10) Patent No.: US 6,942,268 B2
(45) Date of Patent: Sep. 13, 2005

(54) RETRACTABLE STOP

(76) Inventor: Mark Willard Vejnar, 6684 Lookout Ter., Riverside, CA (US) 92505

( * ) Notice: Subject to any disclaimer, the term of this patent is extended or adjusted under 35 U.S.C. 154(b) by 0 days.

(21) Appl. No.: 10/805,418

(22) Filed: Mar. 19, 2004

(65) Prior Publication Data

US 2004/0174032 A1 Sep. 9, 2004

Related U.S. Application Data

(62) Division of application No. 09/795,170, filed on Feb. 27, 2001, now Pat. No. 6,742,822.

(51) Int. Cl.[7] .............................................. B62D 33/03
(52) U.S. Cl. ...................... 296/26.11; 296/57.1; 16/374
(58) Field of Search ............................ 296/26.11, 57.1; 16/374, 332

(56) References Cited

U.S. PATENT DOCUMENTS

| 521,429 A | * | 6/1894 | Bessonette ................... 16/322 |
| 5,287,596 A | * | 2/1994 | Chen et al. ................... 16/331 |
| 5,478,130 A | * | 12/1995 | Matulin et al. ............ 296/57.1 |
| 5,775,759 A | * | 7/1998 | Cummins ................. 296/26.11 |
| 5,918,925 A | * | 7/1999 | Perrin ...................... 296/26.11 |

* cited by examiner

Primary Examiner—Dennis H. Pedder
(74) Attorney, Agent, or Firm—Robert N. Schlesinger

(57) ABSTRACT

This Retractable Stop relates to a new and useful tailgate accessory for trucks and the like. The Retractable Stop may be used to effectively extend the length of a truck bed, and to act as a small auxiliary tailgate or the like, when the truck's primary tailgate is in the horizontal open position.

8 Claims, 29 Drawing Sheets

RETRACTABLE STOP

CROSS-REFERENCES TO RELATED APPLICATIONS

This is a Divisional Patent Application, the parent patent application being Ser. No. 09/795,170 filed on Feb. 27, 2001, and published as U.S. patent application Ser. No. 2002/0121794, on Sep. 5, 2002, and issued as U.S. Pat. No. 6,742,822 (2004). The entire declaration, oath, specification, disclosure, and drawing figures, and each of them, from said parent patent application and said issued patent are hereby incorporated herein by reference, thereto.

STATEMENT REGARDING FEDERAL SPONSORED RESEARCH OR DEVELOPMENT

Not Applicable

REFERENCE TO A "MICROFICHE APPENDIX"

Not Applicable

BACKGROUND OF THE INVENTION

This invention, entitled "Retractable Stop", was devised and invented by Mark Willard Vejnar, and relates to a new and useful type of accessory for a tailgate that may be used to effectively extend the payload area or truck bed for a pickup truck, mini-truck, or the like.

This "Retractable Stop" invention will be referred to throughout this specification and its appended claims, as a proper noun with the first letter of each word capitalized. The Retractable Stop invention may optionally be used in conjunction with an Auxiliary Tailgate, rather than a tailgate (3), i.e., a primary tailgate (3).

The term "truck" as used throughout this specification and its appended claims is intended to also refer to a pickup truck, mini-truck, or a small or medium-sized truck with either an open payload bed or a covered payload bed. The term "truck" is also intended to be broadly construed to include sport utility vehicles, multipurpose vehicles, minivans, station wagons, and trailers, where the tailgate (3) may be opened to a position that is generally parallel to the ground, as shown in the Drawing Figures.

FIELD OF THE INVENTION

The field of this invention relates to a new and useful tailgate accessory for trucks and the like, and most particularly for pickup trucks. The Retractable Stop disclosed herein, may be effectively used as a "miniature tailgate" in a variety of trucks and closely related vehicles that may be used for hauling objects or loads that may shift or move during transport in a truck bed (1) or the like.

DESCRIPTION OF THE RELATED ART INCLUDING INFORMATION DISCLOSED UNDER 37 CFR 1.97 AND 1.98

Heretofore, the safe transport of an object was limited to the size of the payload area or truck bed (1) or the like, and many mini-truck designs, particularly in recent years, have a short truck bed (1) or payload area. It is not uncommon for an object or load, such as a standard piece of four foot by eight foot plywood, drywall, lumber material, ladders, refrigerators, sofas, and other large objects, to be a matter of inches to several feet too long to fit safely into a truck bed (1). One solution to this problem may be to drop the primary tailgate (3) down and allow the long object to extend out of the truck bed (1) for a short distance. This means of transporting a large object, however, may cause safety problems and may be a violation of the law in some jurisdictions. It is not uncommon for large objects and loads to fall out of a truck bed (1), particularly when the tailgate is in the down position, and for these large objects and loads to fall onto a freeway or highway, thereby damaging the objects and causing hazard to the truck driver and to other drivers.

The inventor, Mark Willard Vejnar, has devised and invented a new and useful type of Retractable Stop, for a truck or the like, that may easily be used to effectively extend the length of the truck bed (1), and additionally would effectively secure a payload within the truck bed (1). The means for securing a payload within the truck bed (1) is with a Retractable Stop in the up position, as shown in FIGS. 1 and 28.

BRIEF SUMMARY OF THE INVENTION

In trying to solve the above-described truck and automobile industry problems and disadvantages, and within the scope of this invention, the inventor, Mark Willard Vejnar, conceived, devised, invented, and engineered the new and useful means of effectively extending the effective truck bed (1) of a truck or the like, through the use of a Retractable Stop. During the inventorship process in developing the Retractable Stop, the inventor, Mark Willard Vejner, did also conceive, devise, invent, and engineer a set of new and useful hinges that may be used with the Retractable Stop inventions, and which are intended to rest, set, hold, lock, or fix the hinge at a desired angle, such as a 90-degree angle, through the use of a hinge rib (50)/hinge rib restraint (51) means, as shown in FIGS. 24 and 25, or through the use of an additional new and useful hinge dimple (65)/hinge dimple port (68) means, also invented by Mark Willard Vejnar, and as shown in FIGS. 26 and 27.

The objectives and advantages of the Retractable Stop invention includes its hideaway feature which allows the user to optionally use the Retractable Stop by pulling the Retractable Stop out of its horizontal closed or hideaway position. The Retractable Stop may be tucked away into the top portion of the front section of the primary tailgate (3) or an optional back panel (4), until the user elects to use the Retractable Stop.

Another objective and advantage of the Retractable Stop invention is that it may be composed of a polymeric or composite material, rather than the metal or alloy generally comprising the primary tailgate. The use of a polymeric or composite composition for the Retractable Stop reduces the cost of materials and allows one to mold the parts, thereby further reducing the costs. Other advantages of utilizing polymeric or composite materials, rather than a metal or alloy, includes a lighter weight and lower hardness. The lower hardness may afford the user greater protection for the painted surface of the truck, when the Retractable Stop is resting on the painted surface of the truck.

The Retractable Stop invention is a valuable means of effectively and safely extending the payload area or truck bed (1) for some mini-trucks or short-bed trucks that would otherwise have limited utility in transporting furniture, such as sofas, refrigerators and bookshelves, and transporting construction materials, such as plywood, drywall, and lumber, from site-to-site, or from lumber yard to construction site.

BRIEF DESCRIPTION OF THE DRAWING FIGURES

The drawing figures reflect selected embodiments of the Retractable Stop, and as intended for use with a pickup truck, but the Retractable Stop is not limited to use with a pickup truck, and may be effectively used with other vehicles, as disclosed above, and may have applications on other types of vehicles, trailers, and the like, as well as in other industries where large objects or payloads may be transported, or where an auxiliary tailgate is used in place of a primary tailgate (3).

Referring again to the drawing figures, like reference numerals are used to refer to like specific parts of the various drawing figures. The tailgate nomenclature is defined as the primary tailgate (3), which is essentially the traditional tailgate, and a hideaway back panel (4), which is optionally attached to the primary tailgate (3) near the top edge of said primary tailgate (3), may be essentially synonymous with the term "auxiliary tailgate". The nomenclature for the position of the primary tailgate (3) and the Retractable Stop is defined as being in a horizontal or vertical position, and being further defined as being in the horizontal closed position, or in the vertical open position, as shown in Drawing Figures.

Figure 5:
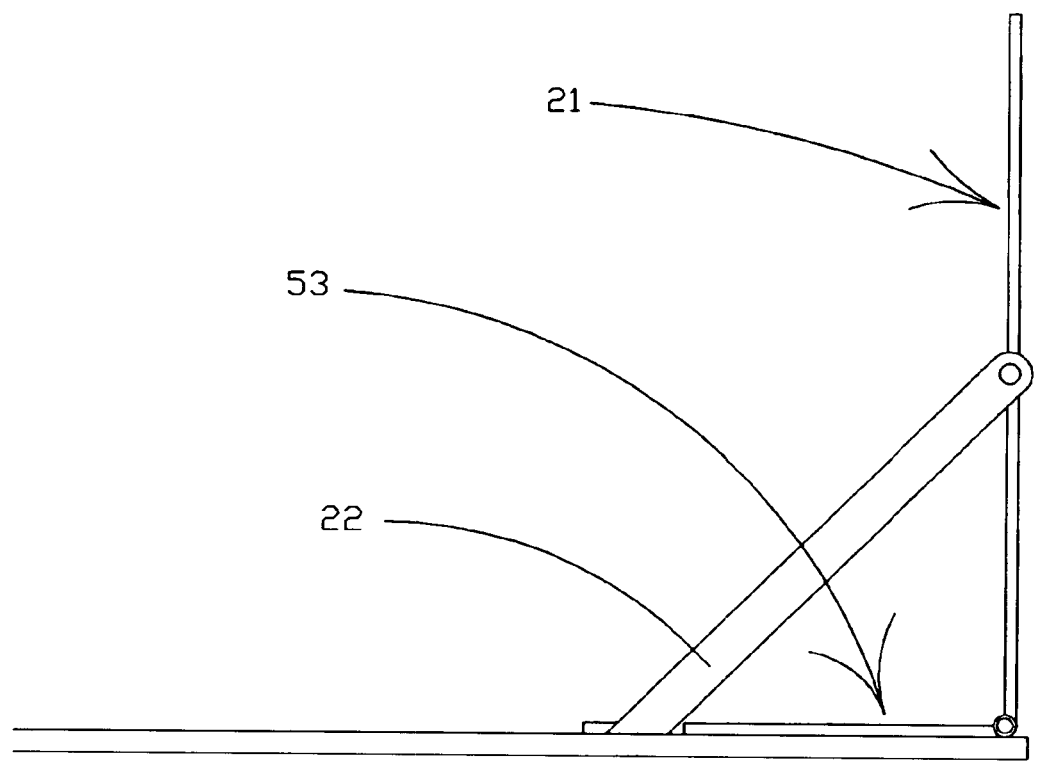

FIG. 5 shows a left side view of the first preferred embodiment of the auxiliary tailgate with a Retractable Stop, and showing the primary tailgate (3) in the horizontal open position, the solid body back panel (4) in the horizontal open position, and the Retractable Stop in the vertical open position, and locked into place utilizing the first preferred hinged tongue (22) and hinged tongue port (23) locking means.

Figure 6:
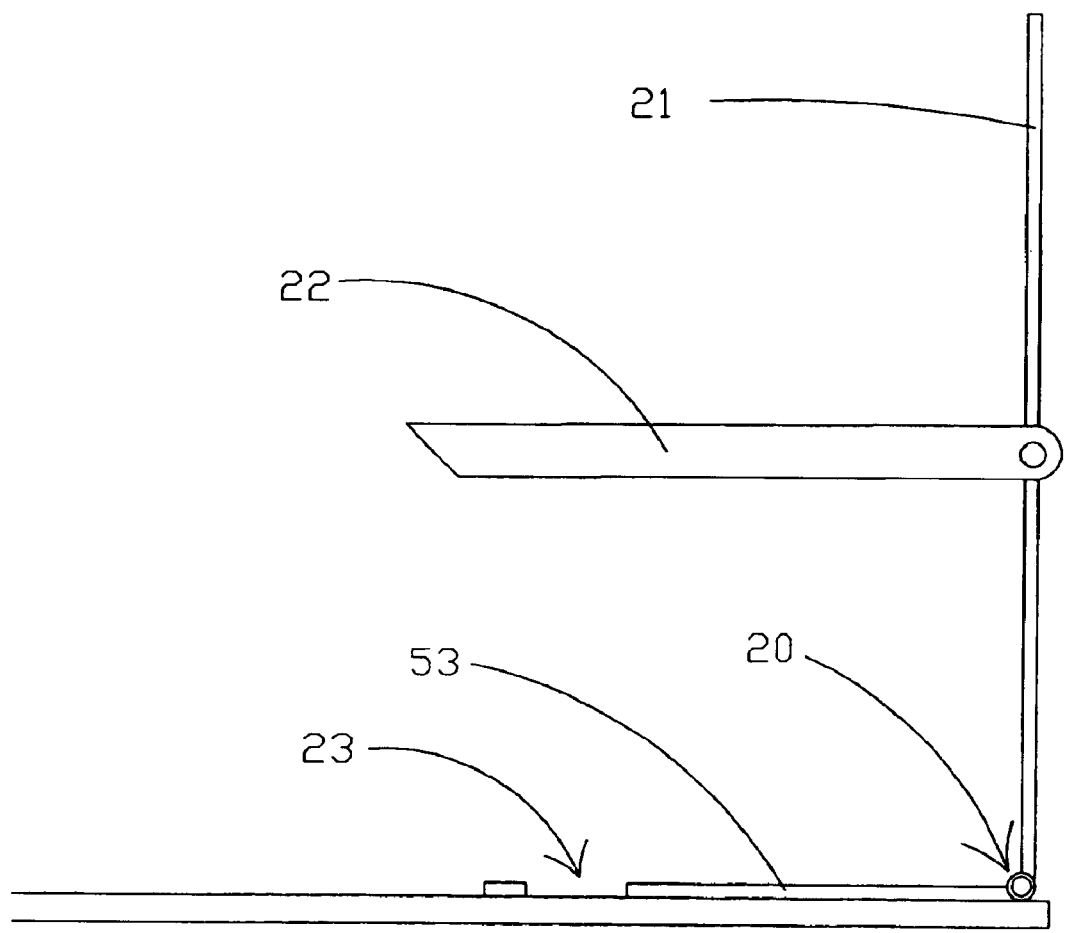

FIG. 6 shows a left side view of the means for locking the Retractable Stop shown in FIG. 5.

Figure 7:
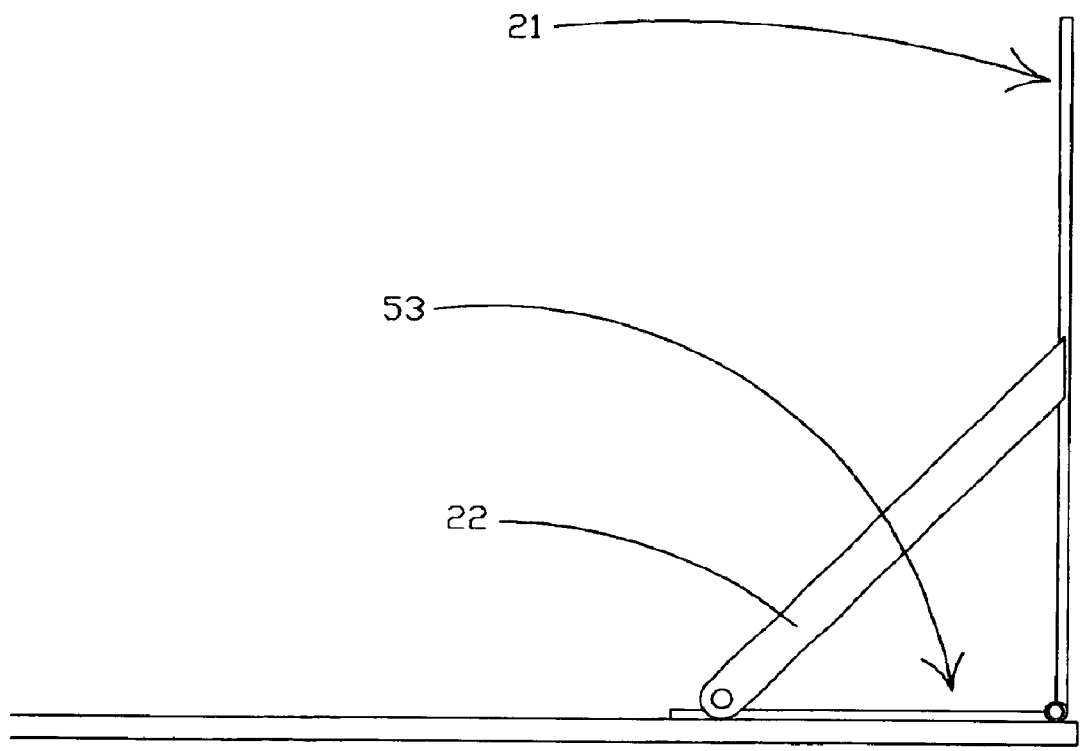

FIG. 7 shows a left side view of the second preferred embodiment of the auxiliary tailgate with a Retractable Stop, and showing the primary tailgate (3) in the horizontal open position, the solid body back panel (4) in the horizontal open position, and the Retractable Stop in the vertical open position, and locked into place utilizing the second preferred hinged tongue (22) and hinged tongue port (23) locking means.

Figure 8:
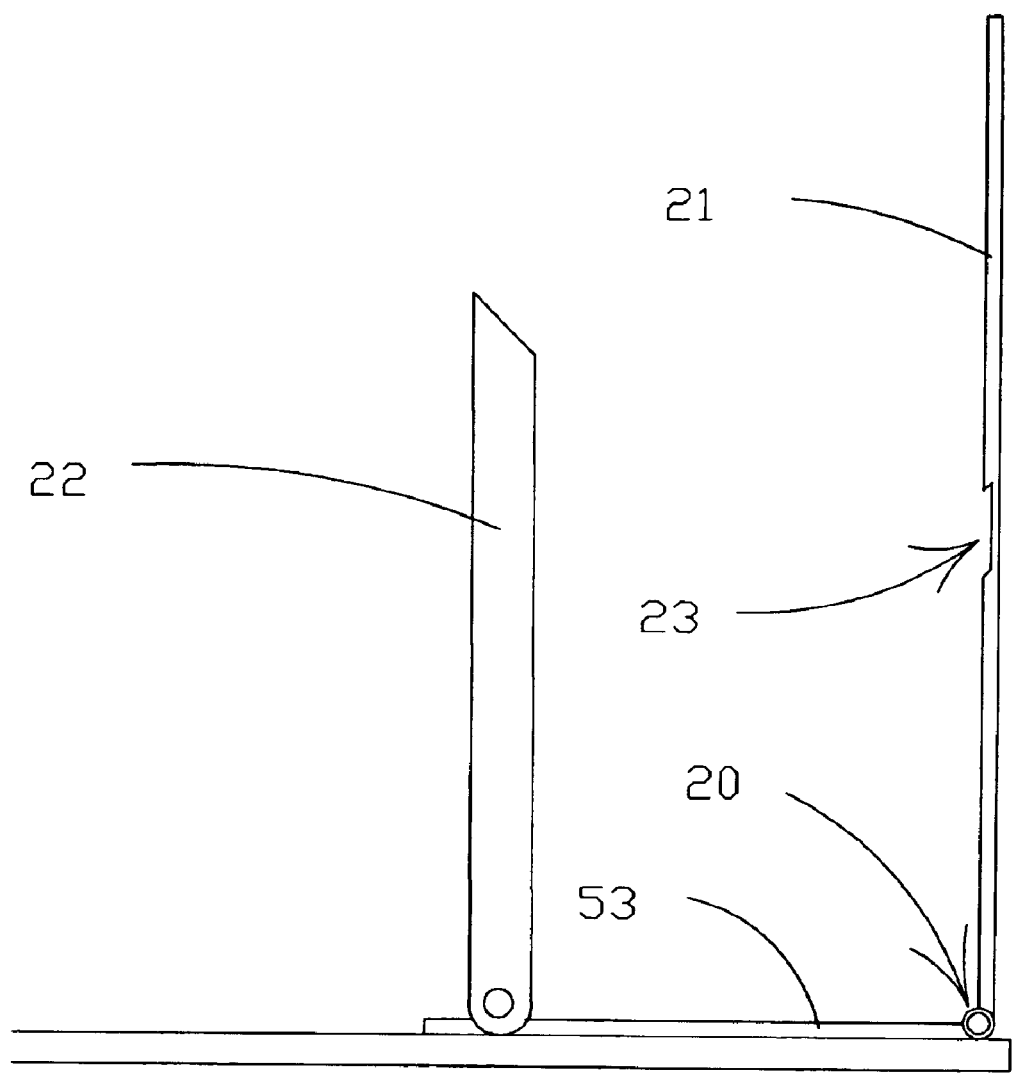

FIG. 8 shows a left side view of the means for locking the Retractable Stop shown in FIG. 7.

Figure 9:
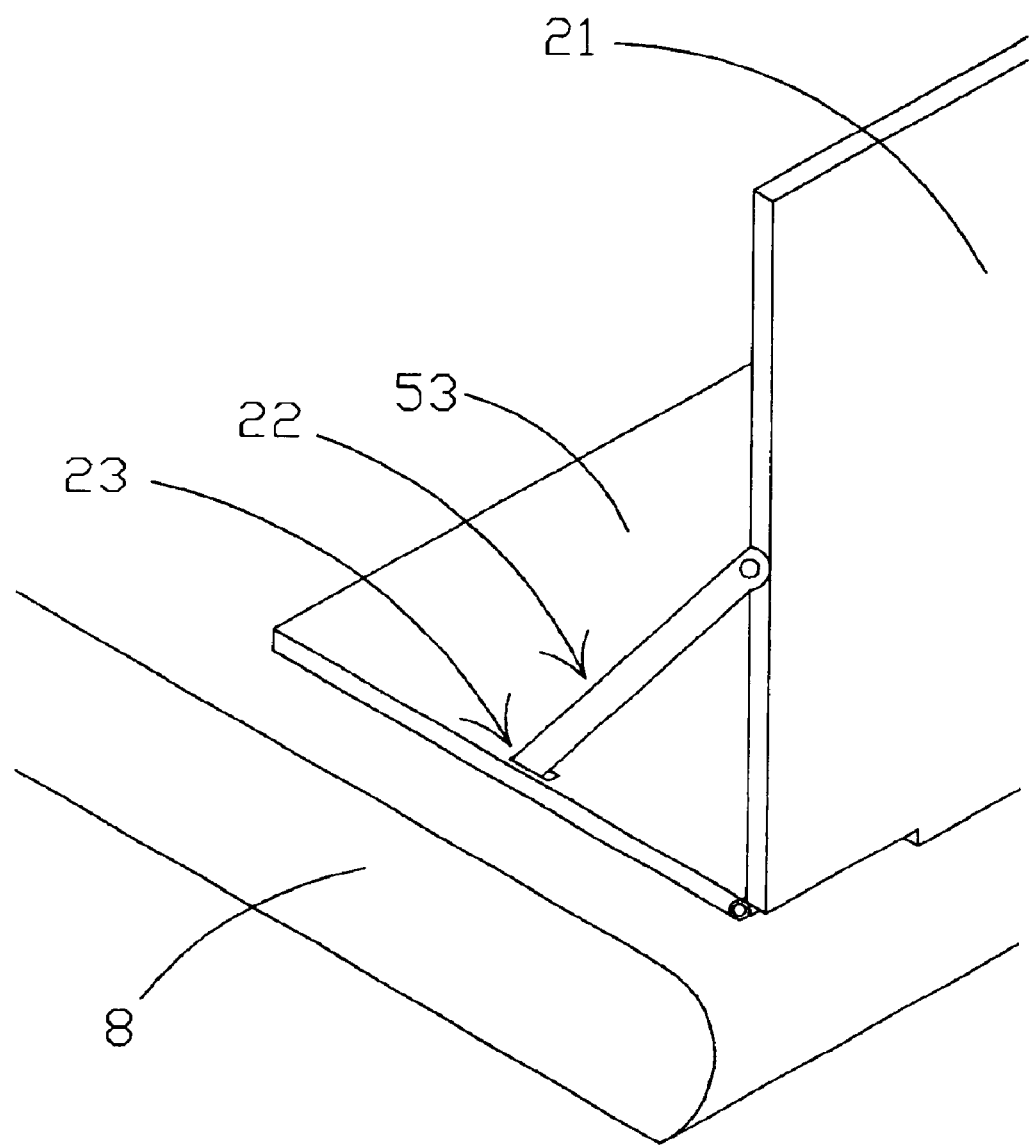

FIG. 9 shows a left isometric view of another embodiment of the locking means for the Retractable Stop, similar to that shown in FIGS. 5–8, but showing a modified hinged tongue port (23).

Figure 10:
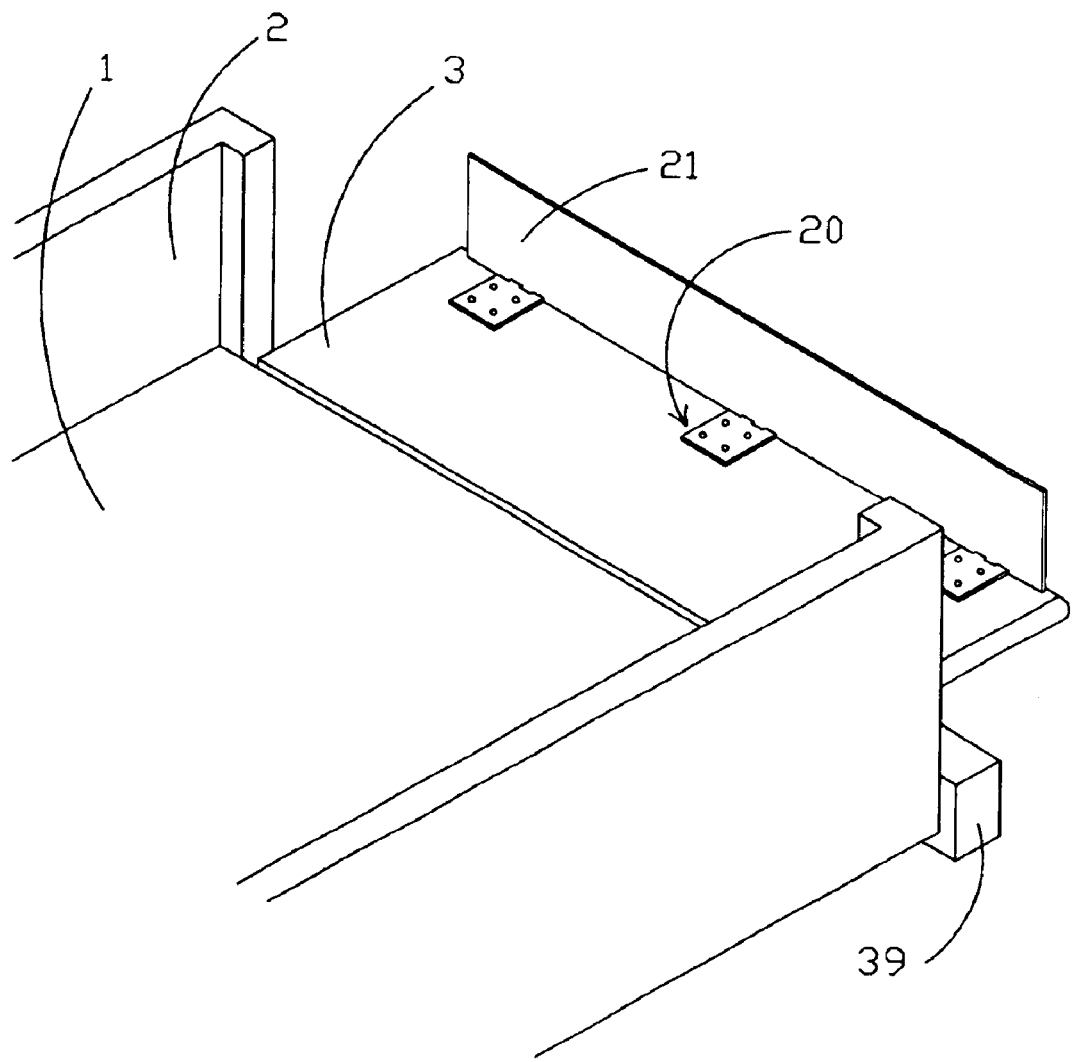

FIG. 10 shows an isometric rear view of a truck bed (1), and showing a first modified embodiment of the Retractable Stop in the vertical open position, and the retractable stop hinge (20) is a hybrid hinge, where the hinge (20) on the extended arm (21) is mated to a plurality of hinges (20), that resemble a two piece hinge (40), and are attached to the primary tailgate (3).

Figure 11:
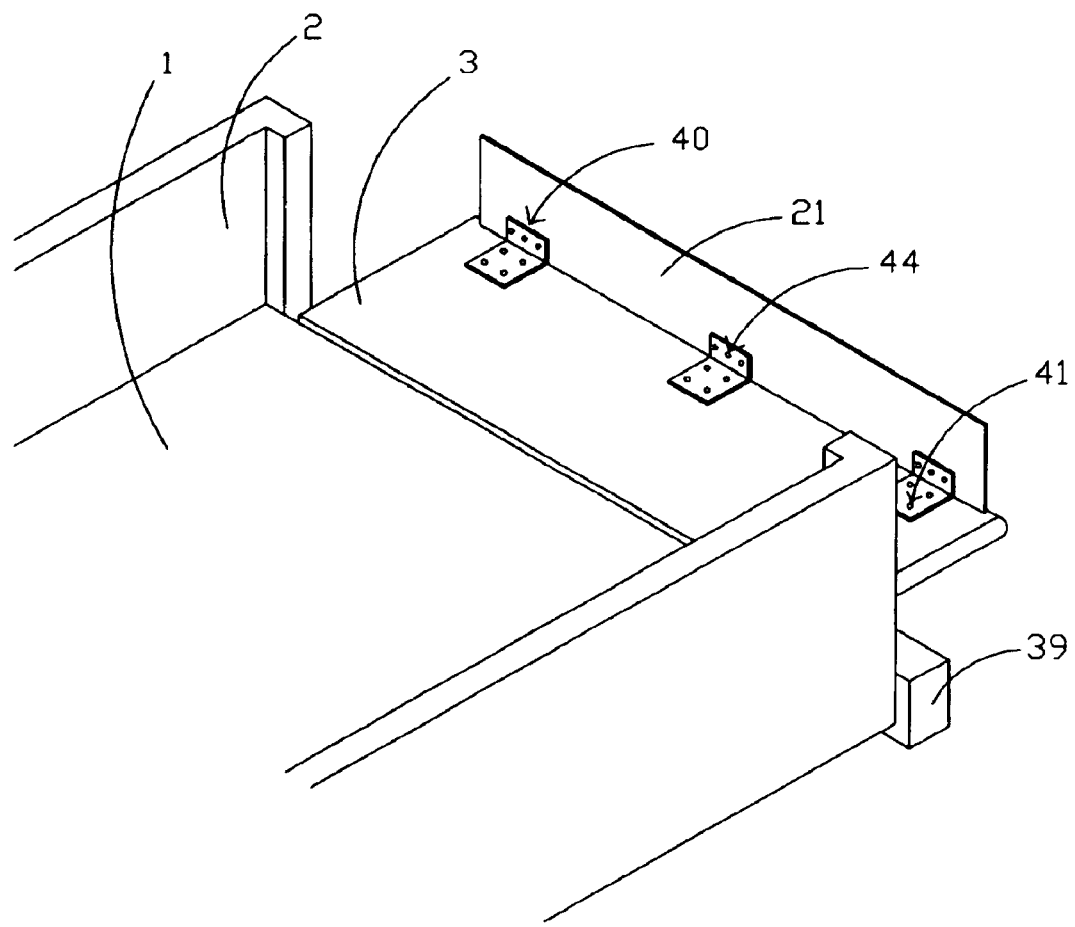

FIG. 11 shows an isometric rear view of a truck bed (1), and showing a second modified embodiment of the Retractable Stop in the vertical open position, and said Retractable Stop has a plurality of two piece hinges (40), with one of each two piece hinge (40) attached to the front side of the primary tailgate (3) with mounting screws (41), and showing the modified planar embodiment of the extended arm (21) attached or affixed to the second piece of said two piece hinge (40) with mounting rivets (44) or the like.

Figure 12:
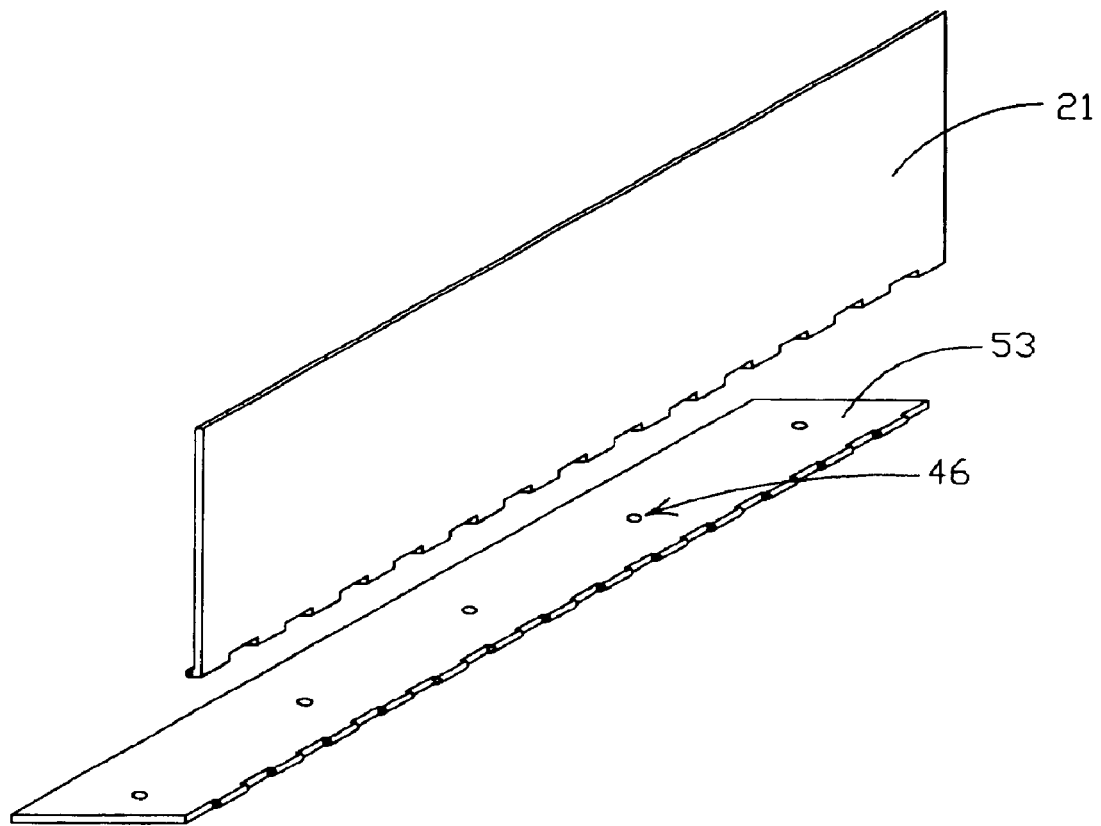

FIG. 12 shows an exploded isometric rear view of the two retractable stop hinge (20) pieces of a preferred embodiment of the Retractable Stop, and showing how the two retractable stop hinge (20) pieces would fit together. The hinge pin (8) and mounting screws (41) are not shown in this drawing figure.

Figure 13:
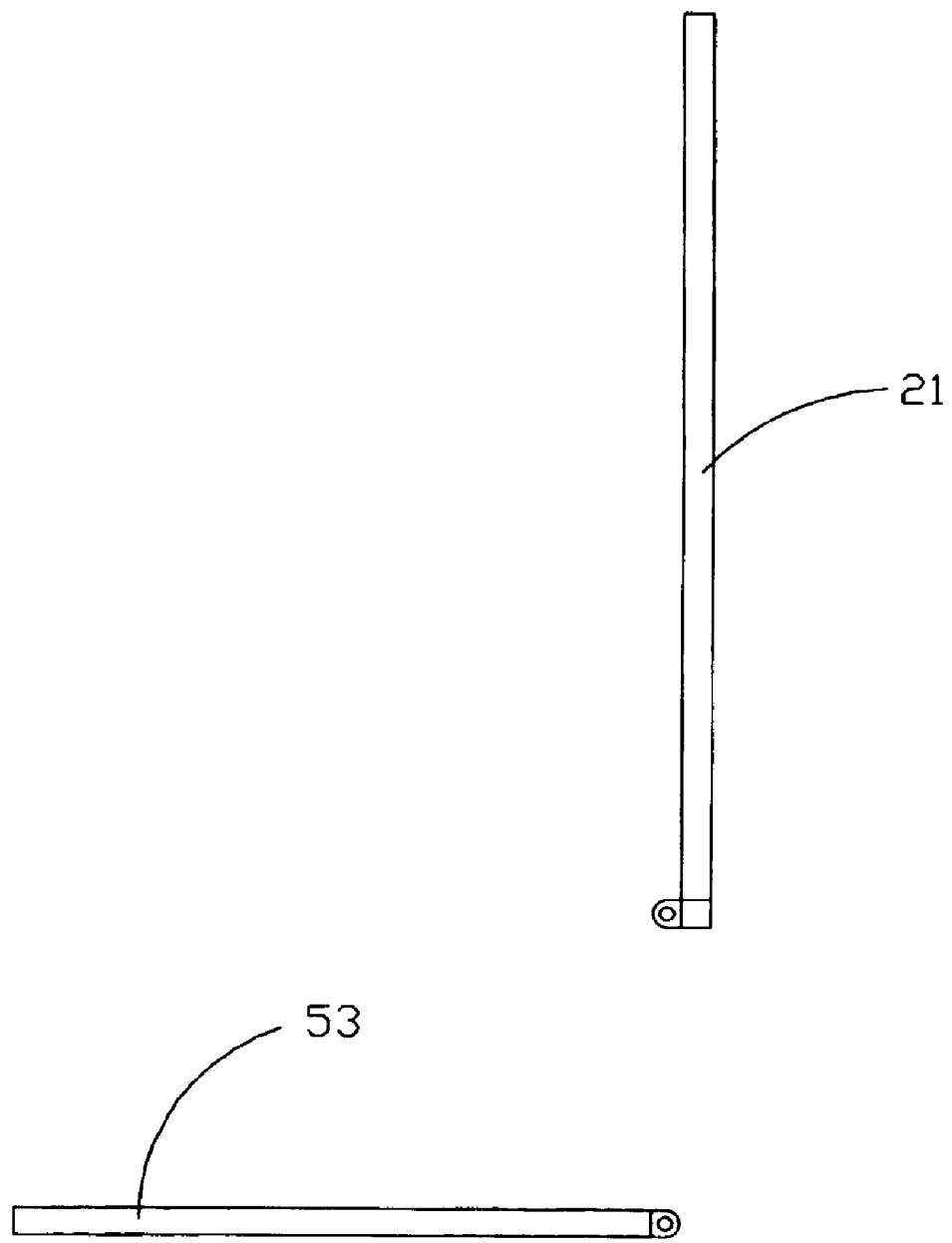

FIG. 13 shows an exploded left side view of the two retractable stop hinge (20) pieces of a preferred embodiment of the Retractable Stop, and showing how the two retractable stop hinge (20) pieces would fit together.

Figure 14:
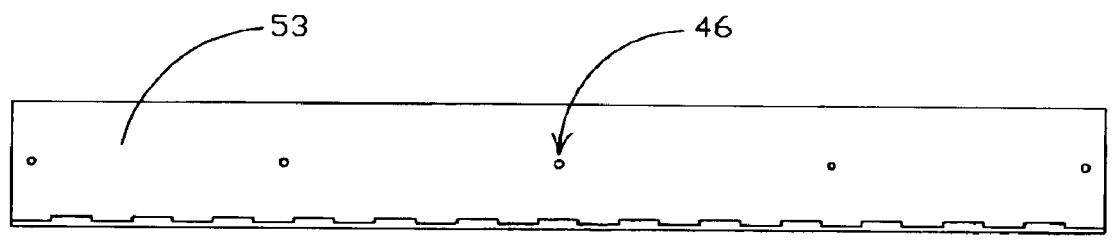

FIG. 14 shows a top view of the preferred embodiment of the Retractable Stop in the vertical open position, and showing most of the mounting plate (53).

Figure 15:
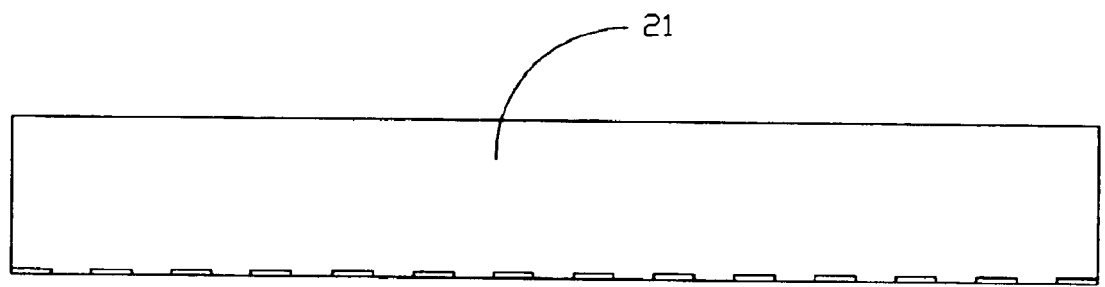

FIG. 15 shows a rear view of the preferred embodiment of the Retractable Stop in the vertical open position.

Figure 16:
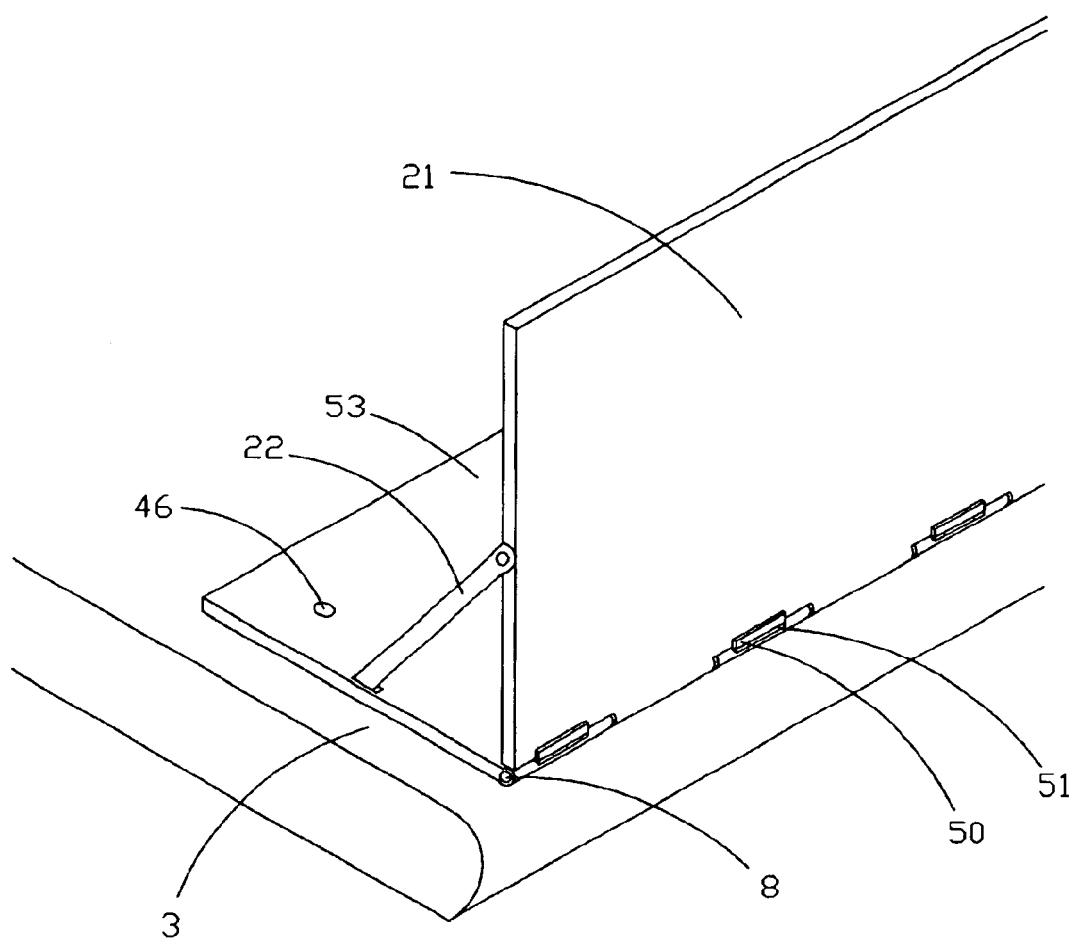

FIG. 16 shows an isometric rear view of a portion of a preferred embodiment of the Retractable Stop installed on a primary tailgate (3), with the Retractable Stop at a 90-degree vertical open position.

Figure 17:
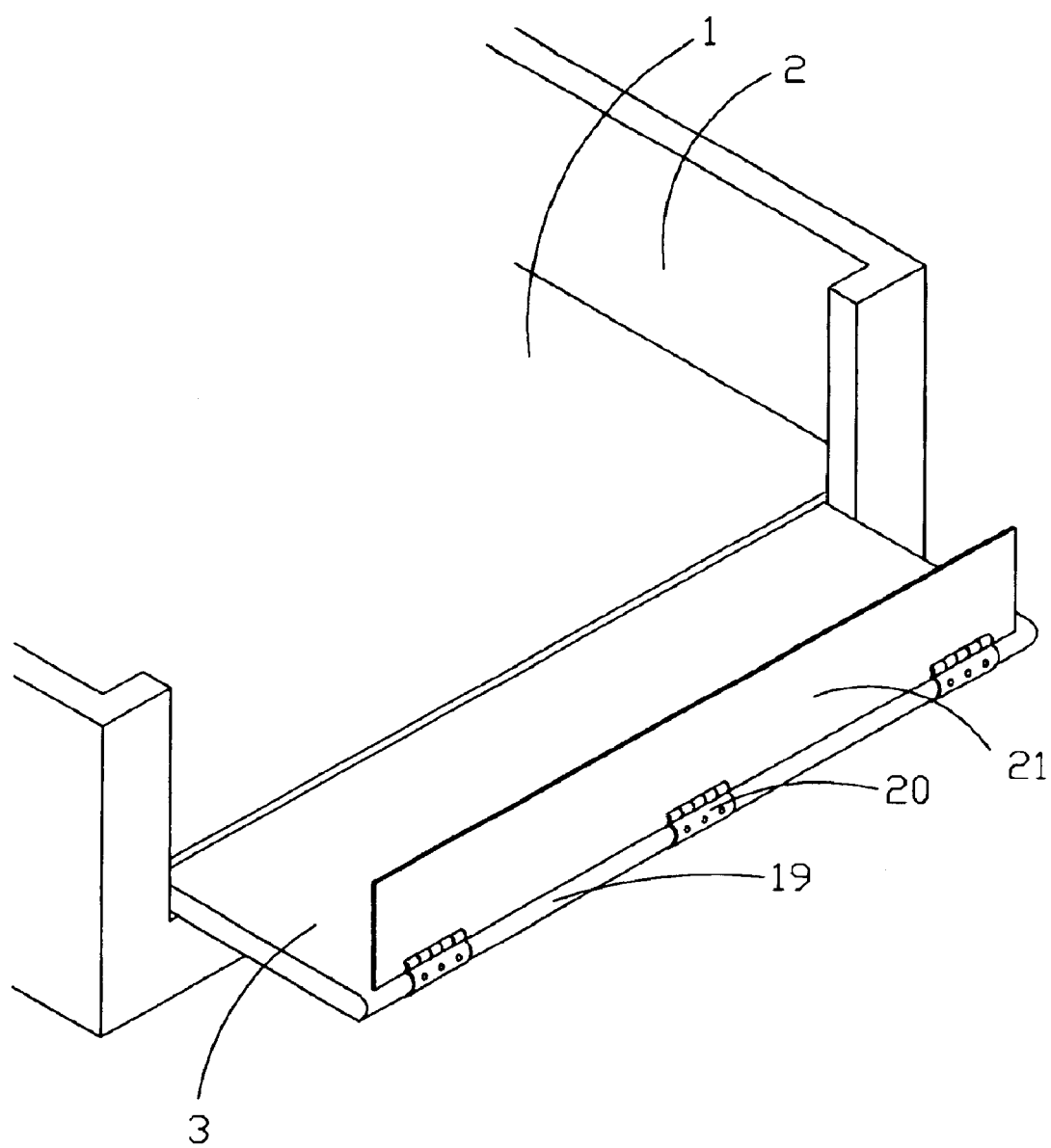

FIG. 17 shows an isometric rear view of a primary tailgate (3) with a Retractable Stop attached with a hinge (20) to the top back panel edge (19).

Figure 18:
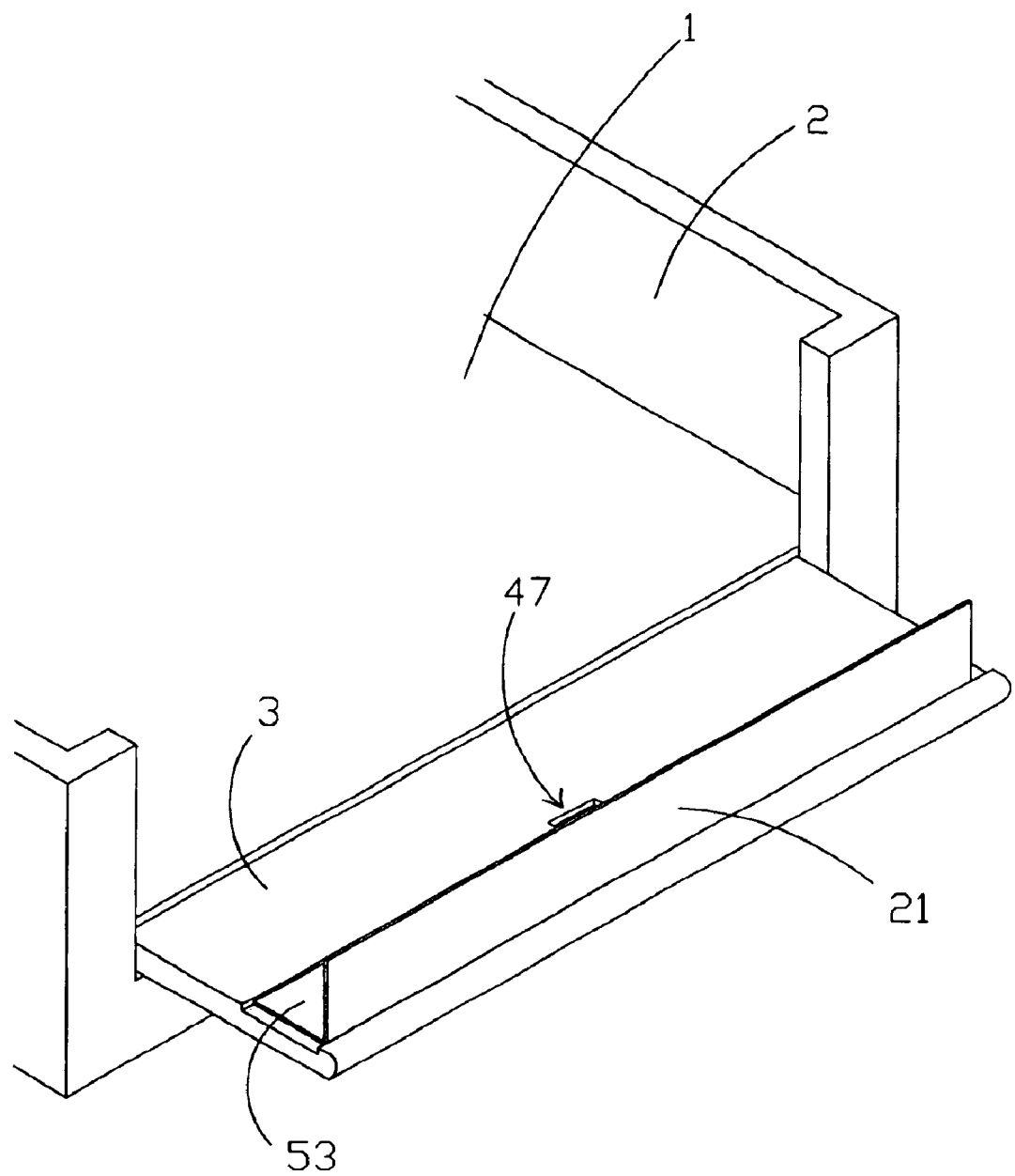

FIG. 18 shows an isometric rear view of a primary tailgate (3) with a Retractable Stop in the vertical open position, and the mounting plate (53) fit into a recessed area on the front side of the primary tailgate (3).

Figure 19:
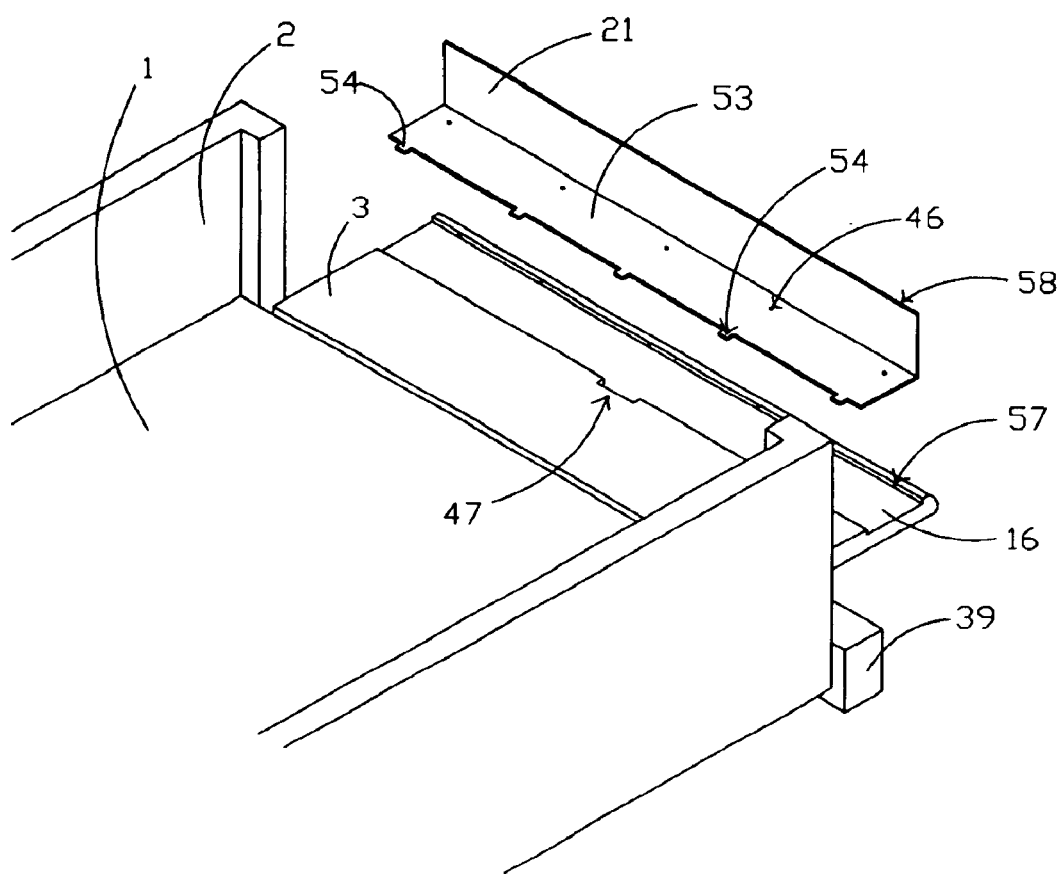

FIG. 19 shows an exploded isometric front view of a primary tailgate (3), and showing how a Retractable Stop may be affixed to the recessed area on the front side of the primary tailgate (3). The primary dimples (56) and the secondary dimples (58) are located on the extended arm (21).

Figure 20:
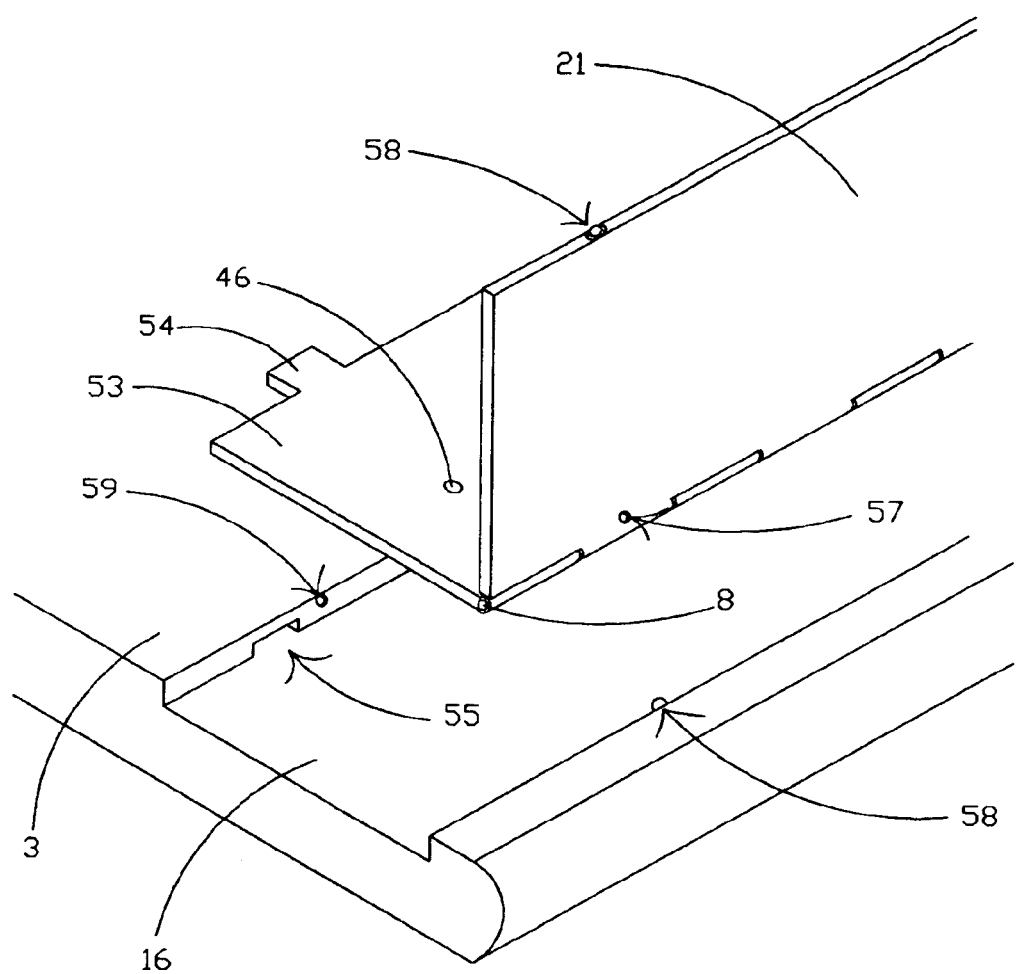

FIG. 20 shows an exploded isometric rear view of a portion of a primary tailgate (3) and Retractable Stop from FIG. 19, and showing how the Retractable Stop may be affixed to the recessed area on the front side of the primary tailgate (3).

Figure 21:
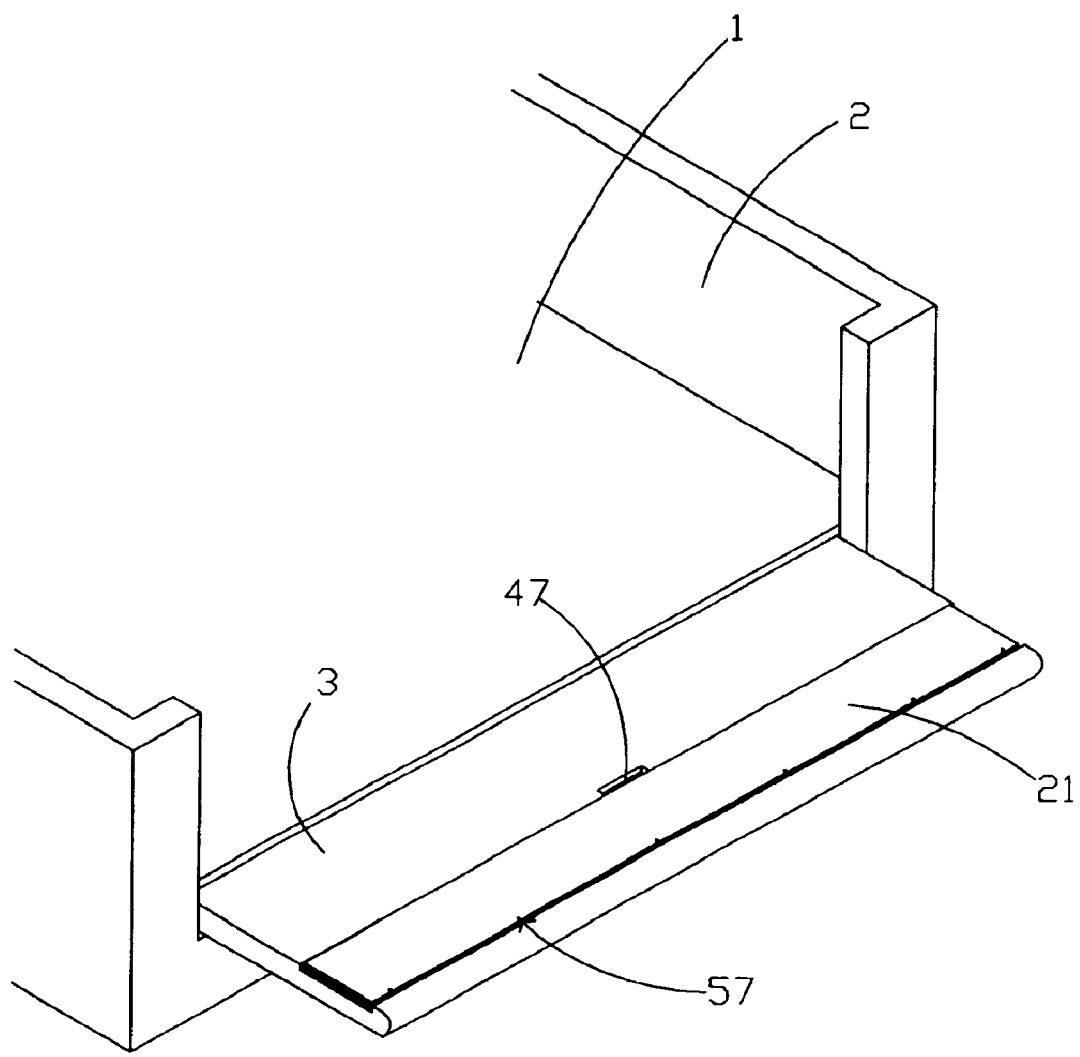

FIG. 21 shows an isometric rear view of a primary tailgate (3) with a Retractable Stop in the horizontal closed position, and the Retractable Stop fit into the recessed area on the front side of the primary tailgate (3).

Figure 22:
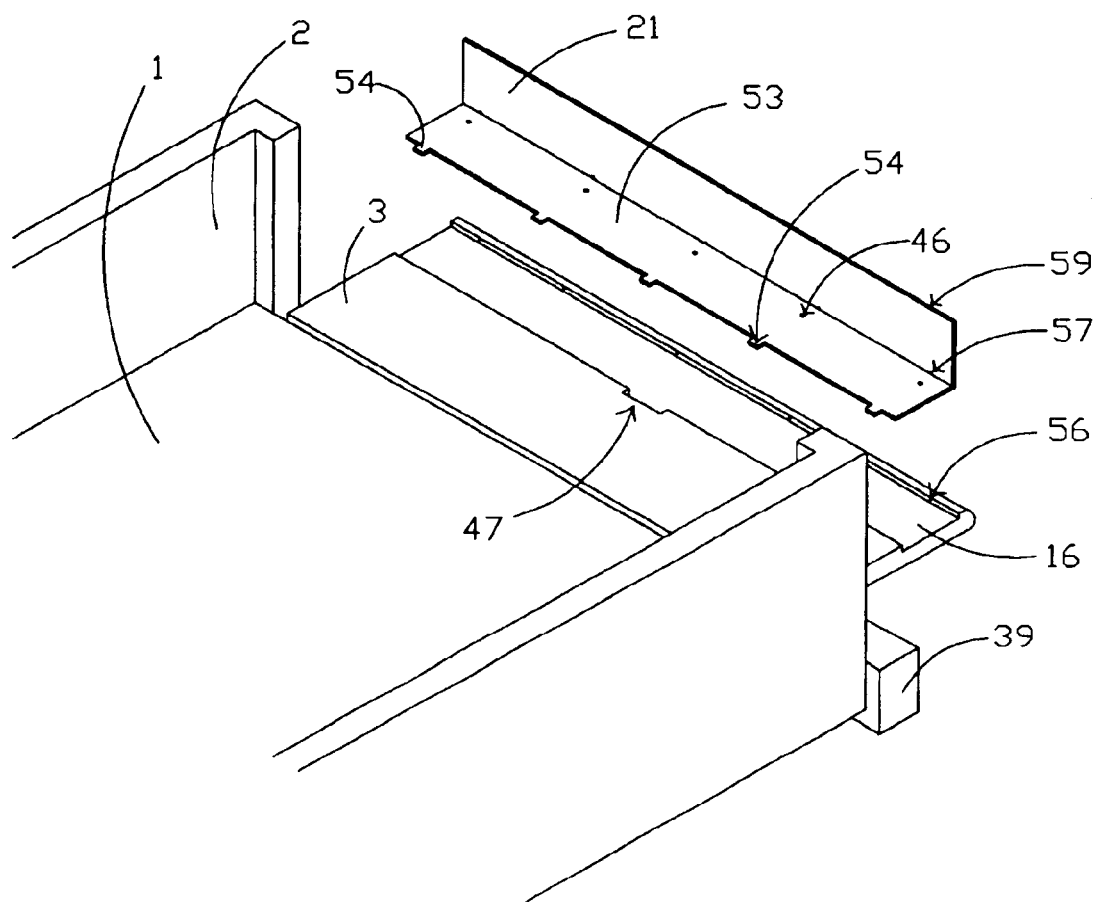

FIG. 22 shows an exploded isometric front view of a primary tailgate (3), and showing how a Retractable Stop may be affixed to the recessed area on the front side of the primary tailgate (3). The primary dimple ports (57) and the secondary dimple ports (59) are located on the extended arm (21).

Figure 23:
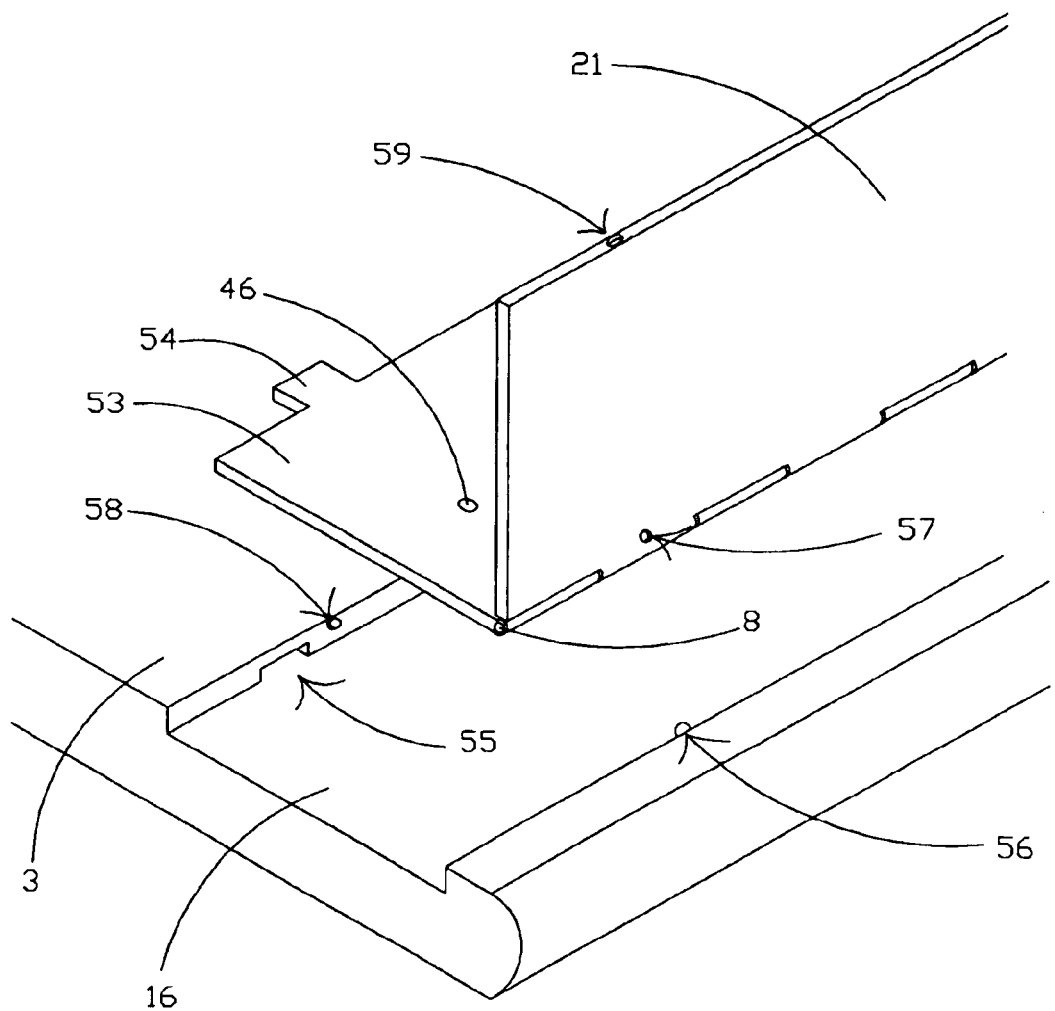

FIG. 23 shows an exploded isometric rear view of a portion of a primary tailgate (3) and Retractable Stop from FIG. 22, and showing how the Retractable Stop may be affixed to the recessed area on the front side of a primary tailgate (3).

Figure 24:
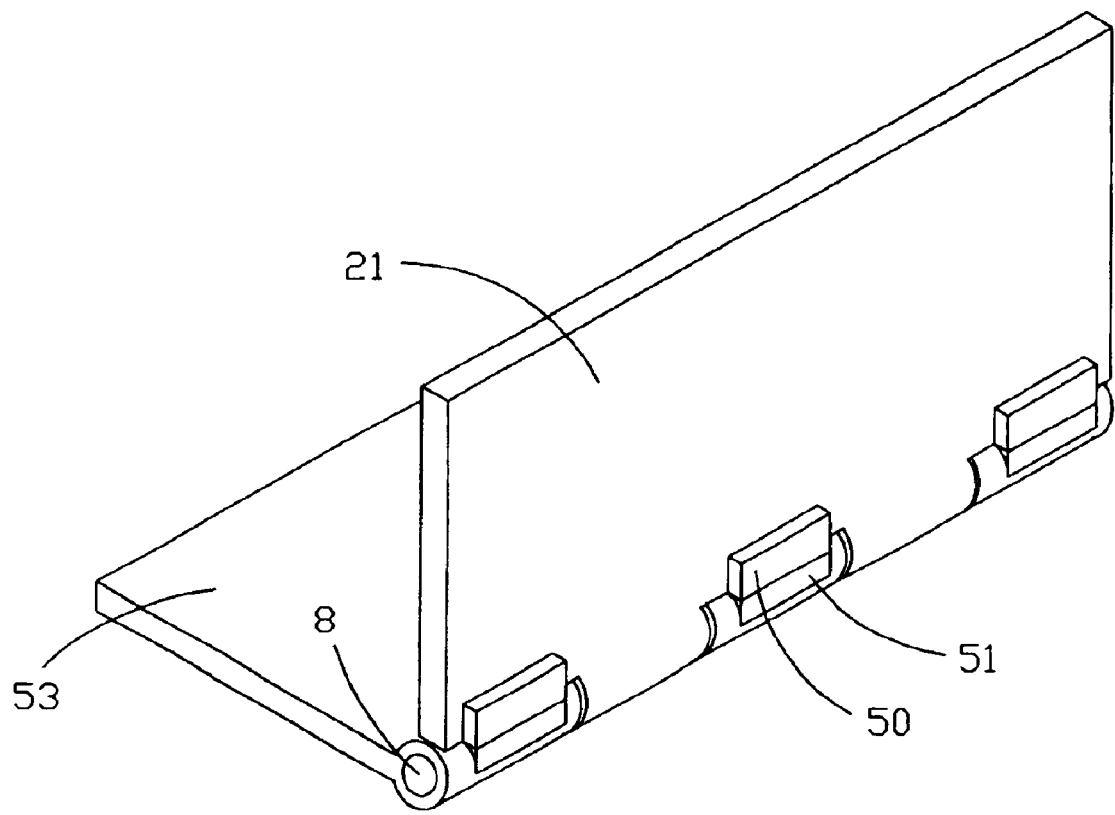

FIG. 24 shows an isometric rear view of a modified embodiment of the Retractable Stop in the vertical open position, and showing a new and useful embodiment of the retractable stop hinge (20) for locking the Retractable Stop at a desired angle, such as a 90-degree up position.

Figure 25:
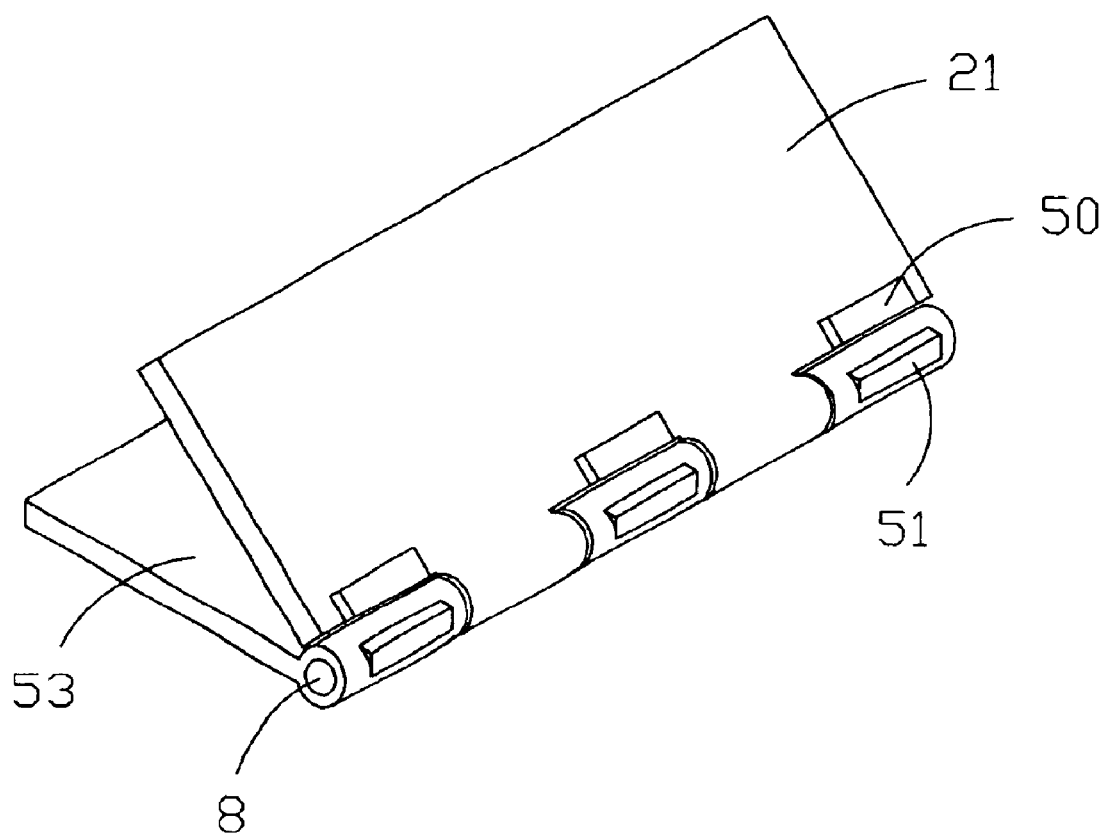

FIG. 25 shows an isometric rear view of a modified embodiment of the Retractable Stop in a position intermediate between the vertical open position and the horizontal closed position, and showing a new and useful embodiment of the retractable stop hinge (20) for locking the Retractable Stop at a desired angle, such as a 90-degree up position.

Figure 26:
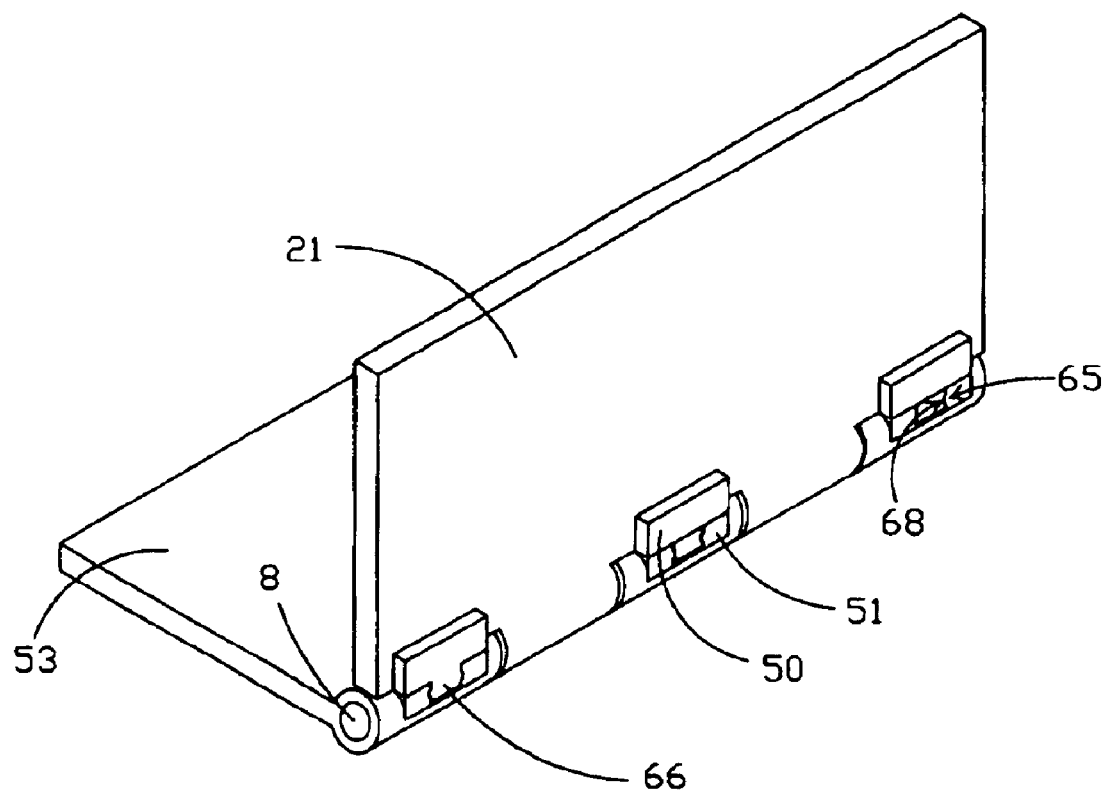

FIG. 26 shows an isometric rear view of a hinge (7, 20, 40) in the open position, that is adaptable for use with the Retractable Stop and the auxiliary tailgate, and showing the means for locking the hinge (7, 20, 40) in the open position.

Figure 27:
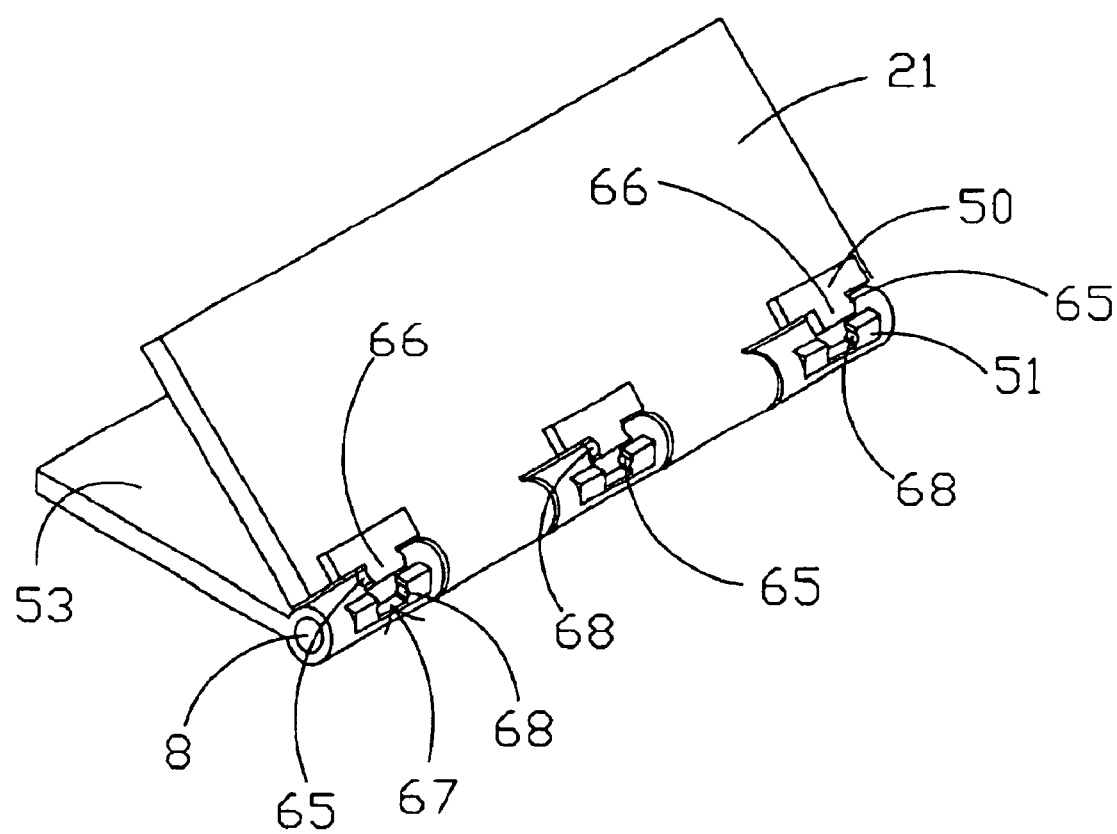

FIG. 27 shows an isometric rear view of a hinge (7, 20, 40) in the partially open position, that is adaptable for use with the Retractable Stop and the auxiliary tailgate, and showing the means for locking the hinge (7, 20, 40) in the open position.

Figure 28:
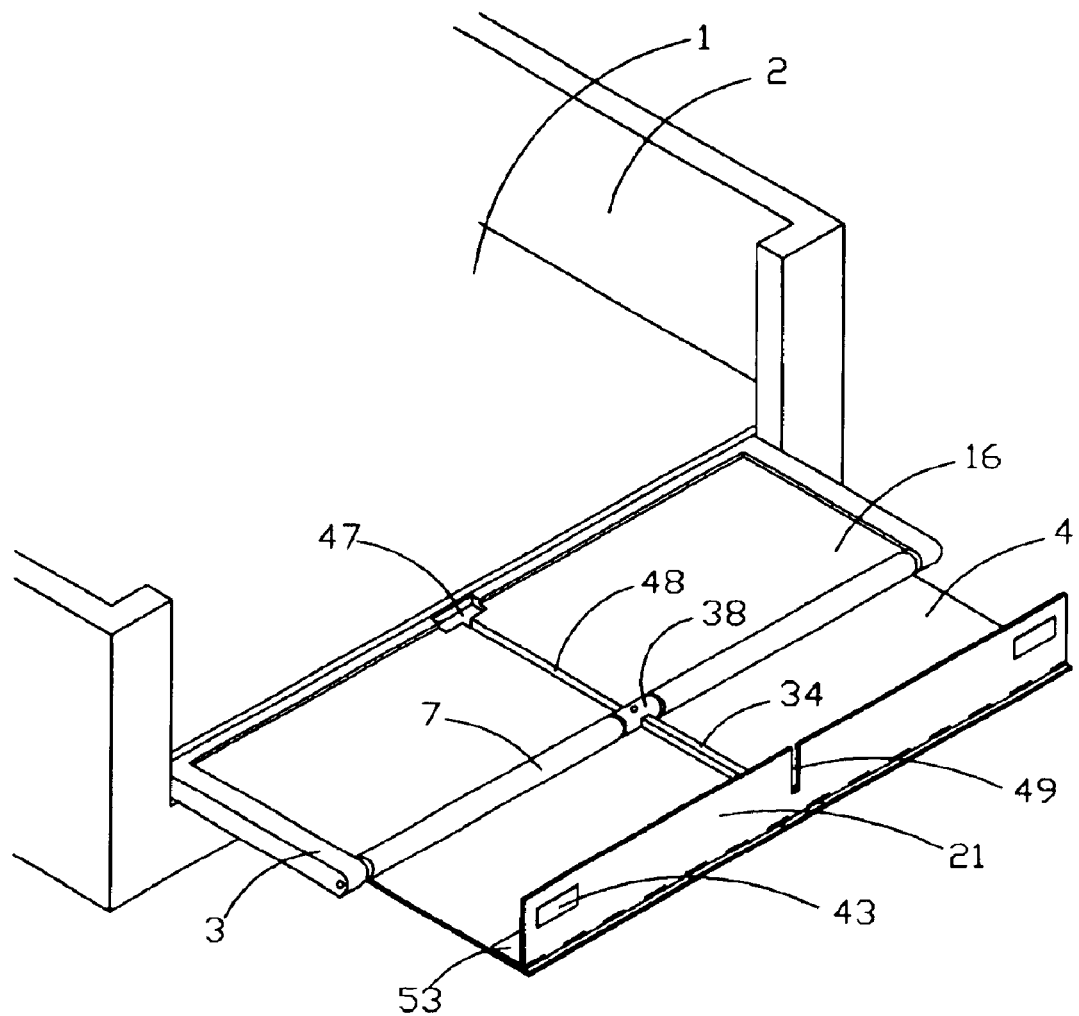

FIG. 28 shows an isometric rear view of a truck with and auxiliary tailgate and a Retractable Stop attached thereto, and showing the primary tailgate (3) in the horizontal open position, and the solid body back panel (4) of the auxiliary tailgate in the horizontal open position, and with a Retractable Stop in the vertical open position.

Figure 29:
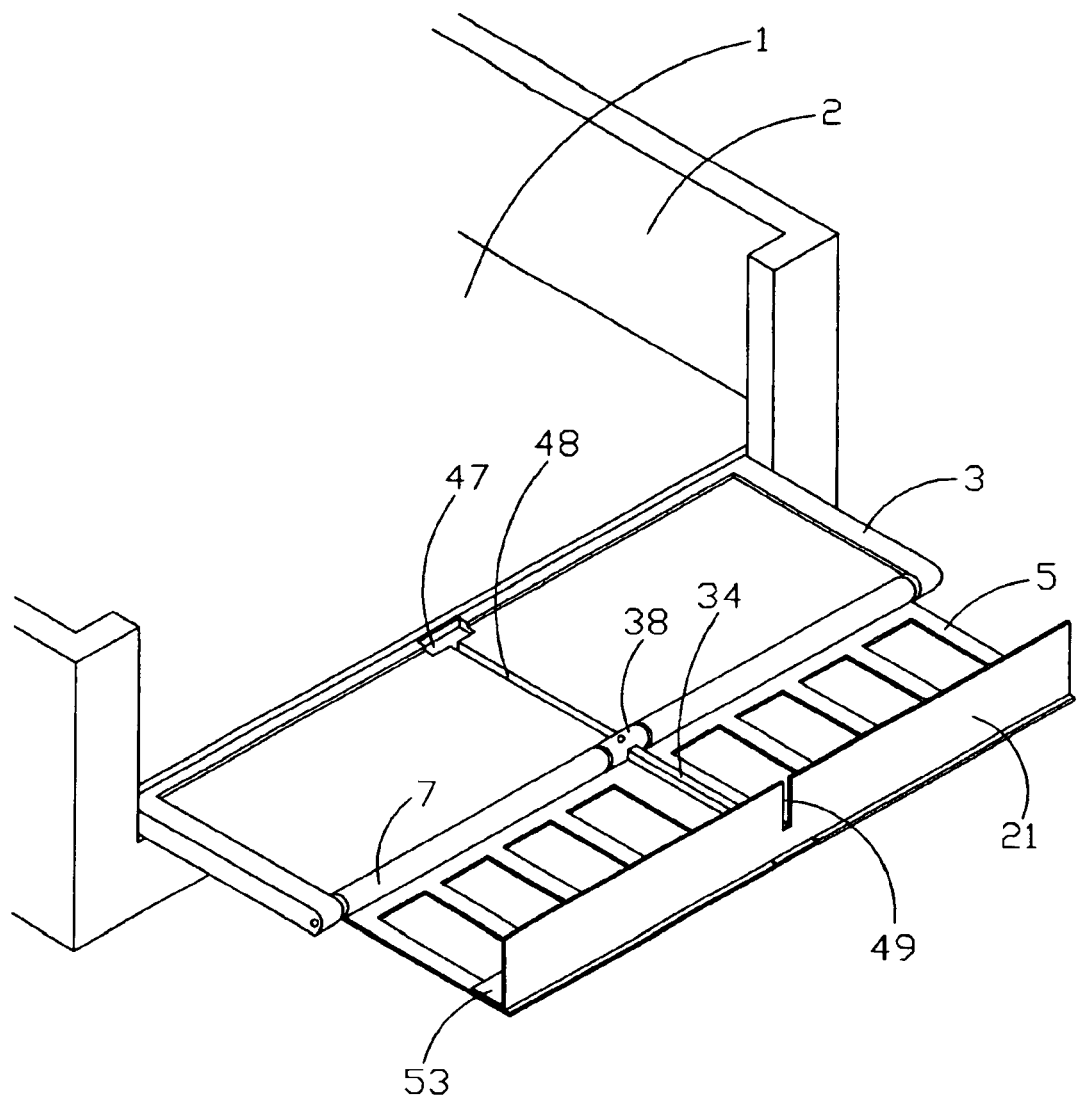

FIG. 29 shows an isometric rear view of a truck with an auxiliary tailgate and a Retractable Stop attached thereto, and showing the primary tailgate (3) in the horizontal open position, and the attached open frame back panel (5) in the horizontal open position, with its attached Retractable Stop in the vertical open position.

DETAILED DESCRIPTION OF THE REFERENCE NUMERALS

Referring now to the drawing figures, like reference numerals are used to refer to like specific parts of the various Drawing Figures and components cited in the specification. The reference numerals used throughout this specification comport with those used in the present Divisional's parent patent application, and issued patent. The description of the reference numerals used to describe the various parts of the Drawing Figures and the specification and its appended claims follows.

The truck bed (1) is the bed, payload area, cargo area, or the like, that is located in the rear portion of a truck or the like, and may be an open or closed truck bed (1). The truck bed (1) generally extends from the back of the cab of a truck to the primary tailgate (3) of a truck.

The truck bed wall (2) is the wall or the like that is generally perpendicular to and extends in a vertical direction from the attached horizontal truck bed (1). The truck bed wall (2) generally extends about three sides of the truck bed (1) perimeter, and generally excludes the primary tailgate (3) area. There is typically a left, a right and a front truck bed wall (2) in most trucks or the like, and particularly pickup trucks.

The primary tailgate (3) is the tailgate that may be factory issue and is located at the terminal end of the truck bed (1), and may be used to enclose the terminal end of the truck bed (1) with a component, i.e., the tailgate, that effectively acts as fourth truck bed wall (2).

The back panel (4) is the major component of an optional auxiliary tailgate, which acts as a secondary tailgate or fourth truck bed wall (2), when the primary tailgate (3) is in the horizontal open position, and the optional back panel (4) is raised to the vertical up position.

The open frame back panel (5) is the embodiment of the back panel (4) where the back panel (5) is partially open or has a grid-like or a frame-like appearance, as shown in FIG. 10. The open frame back panel (5) is preferred in some applications of the Auxiliary Tailgate because of the aerodynamic advantages of a more streamlined flow than is found in a solid body back panel (4), and because with the open-frame back panel (5), one may enclose the truck bed (1), and have over-sized objects such as lumber or piping extending through said open-frame back panel (5) a safe distance, and in a manner that said over-sized objects will be transported in a more stable position, and will not roll around in the truck bed (1). Throughout this specification and its appended claims, the term back panel (4) may also be interpreted to also refer to the open-frame back panel embodiment. The term solid body back panel is used to distinguish the open-frame back panel (5) from embodiments of the back panel (4) that may not be synonymous with the open-frame back panel.

The hinge pin (8) is the pin, tongue, rod, axle, or the like, that may be cable controlled, and may matedly may fit into a hinge pin port (9), and through a hole or channel in a hinge (7), thereby allowing the hinge (7) to rotate about the axis of the hinge pin (8). The hinge pin (8) is the means that effectively attaches the Retractable Stop to the back panel (4), and is the means that effectively attaches the back panel (4) to the primary tailgate (3).

The hinge pin port (9) is the port, receptacle, hole, channel, or the like, that matedly receives the hinge pin (8), and may thereby lock the optional back panel (4) into a pre-set position onto the primary tailgate (3), and may also thereby lock the retractable stop hinge (20) into a pre-set position onto the primary tailgate (3) or the back panel (4).

The back panel recessed area (16) is the recessed area that is located on the rear side of the primary tailgate (3), and is molded or formed to matedly receive the back panel (4 or 5), that is attached at the horizontal back panel hinge (7). When the back panel (4 or 5) is rotated about the axis of the horizontal back panel hinge (7), and rotated into the back panel recessed area (16), the fit should be snug. A small protruding dimple, a snap or the like may optionally be used as an additional locking means. In some embodiments of the inventions disclosed herein, the back panel recessed area (16) may alternatively be used to receive of hold a back panel (4) with a Retractable Stop affixed thereto, a mounting plate (53) for either a Retractable Stop or an auxiliary tailgate, or a mounting plate (53) and the extended arm (21) of a Retractable Stop.

The top back panel edge (19) is the top edge of the back panel (4), when the back panel (4) is in the vertical up position. The top back panel edge (19) is one of the positions for attaching or affixing a hinge for one of the embodiments of the Retractable Stop, as shown in FIG. 17.

Figure 3:
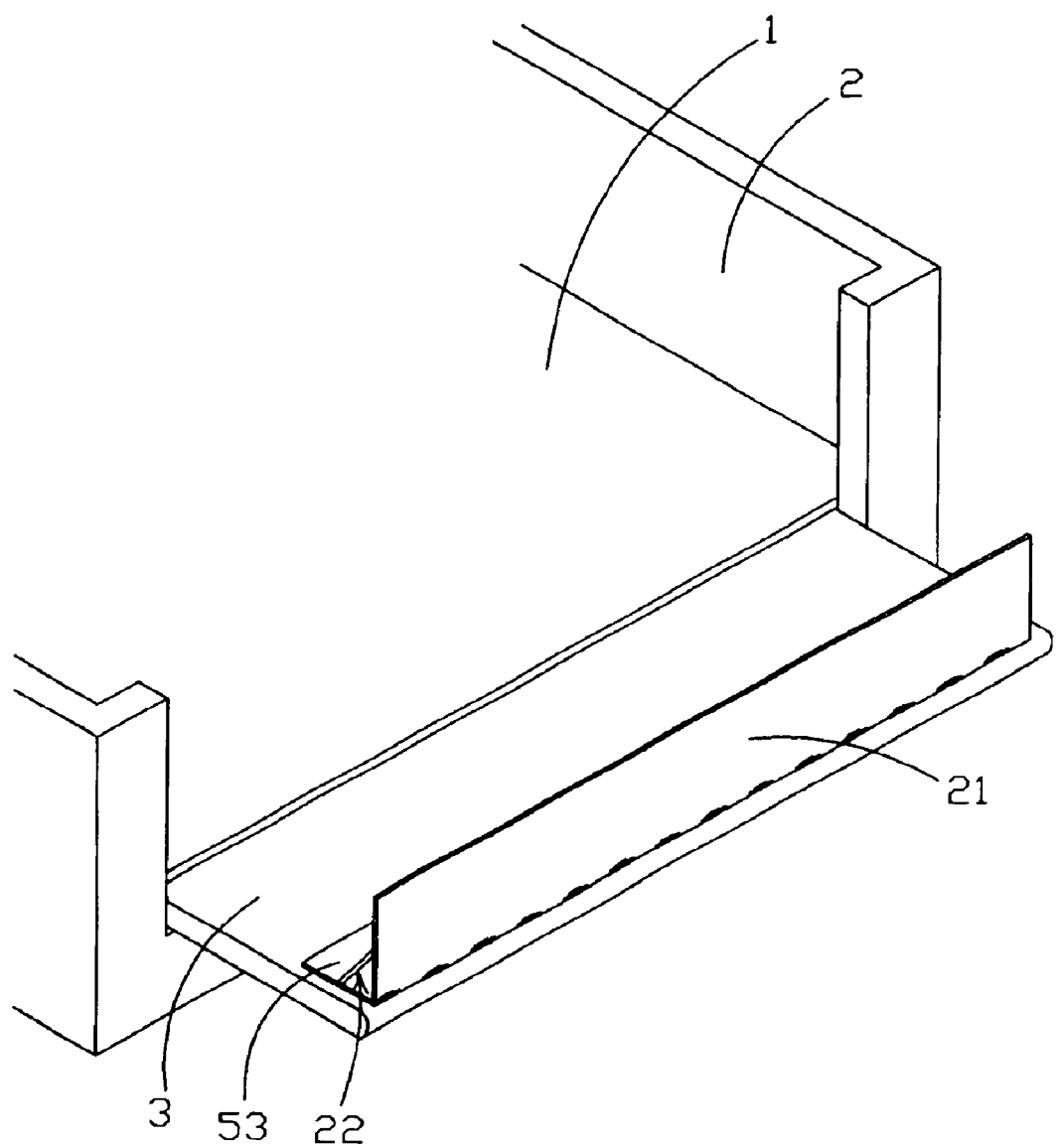
FIG. 3 shows an isometric rear view of a portion of a truck, and showing the primary tailgate (3) in the horizontal open position, and showing the modified embodiment of the Retractable Stop, and with said Retractable Stop in the vertical open position.

The retractable stop hinge (20) is the hinge, axle, or the like, which may be located at along the top back panel edge (19), as shown in FIG. 28, or alternately along the top edge of the primary tailgate (3), as shown in FIG. 3. The retractable stop hinge (20) is preferred to be a hinge (20) that would stop or lock at approximately 90-degrees, when the Retractable Stop is in the open position, an example of new and useful 90-degree hinge (20) embodiments devised and engineered by Mark Willard Vejnar, are shown in FIGS. 24–27. The use of a manually operated hinged tongue (22) and its associated hinged tongue port (23) is one means to assure that the Retractable Stop remains in the open position, when opened, and does not fall back into the closed position, during transit, when the truck may be passing over bumps and rough roads.

The extended arm (21) is the part of the Retractable Stop that spirals, arcs, or extends out from the central axis of some embodiments of the Retractable Stop, and is, in effect, the wall or barrier that is the visible stopping means, as shown in FIG. 11, which shows a solid body extended arm (21). Some modified embodiments of the extended arm (21) may be open frame, and may be attached or affixed to one of the hinge pieces (41) in a two piece hinge (41), using mounting rivets (44) or the like. This modified embodiment of the extended arm (21) may be employed in kit versions or embodiments of the Retractable Stop, which would be easy to assemble, and would be comprised essentially of the planar extended arm (21), one or more two piece hinges (41), mounting rivets (44) or the like, and one or more optional reflectors (43).

The hinged tongue (22) is an optional locking means for the Retractable Stop, and is optimally a tongue, hinged tongue, hinge, or the like that may rotate about an axis, and in an arc, such that when the Retractable Stop is in the open position, the hinged tongue (22) may be rotated into a hinged tongue port (23) or the like, thereby effectively locking the Retractable Stop into place in the open position. Two embodiments of the Retractable Stop using differing types of hinged tongue (22) are shown in FIGS. 5–8.

The hinged tongue port (23) is the port, slot, groove, or the like, that matedly receives the hinged tongue (22), and thereby holds the Retractable Stop into position at approximately 90-degrees. The hinged tongue port (23) may be located on the extended arm (21) of the Retractable Stop, as shown in FIGS. 7 and 8, or may be located on the primary tailgate (3) or back panel (4), as shown in FIGS. 5 and 6, or may be located on the retractable stop hinge (20), as shown in FIG. 9. When the hinged tongue (22) is matedly inserted into the hinged tongue port (23), the Retractable Stop is effectively locked into place in the open position.

The truck bumper (39) is the bumper or the like that is typically a heavy metal or polymeric strip or the like, horizontally located across the front and the rear ends of a vehicle, such as a truck.

The two-piece hinge (40) is the two-piece hinge or the like, that matedly fits together with a hinge pin (8) or the like passing through both pieces of the two-piece hinge (40), thereby matedly affixing the two pieces together, and affecting a hinge (40). This hinging means allows the affixing together of the two-hinge pieces (40), as well as the components that are attached to each piece (40).

Figure 4:
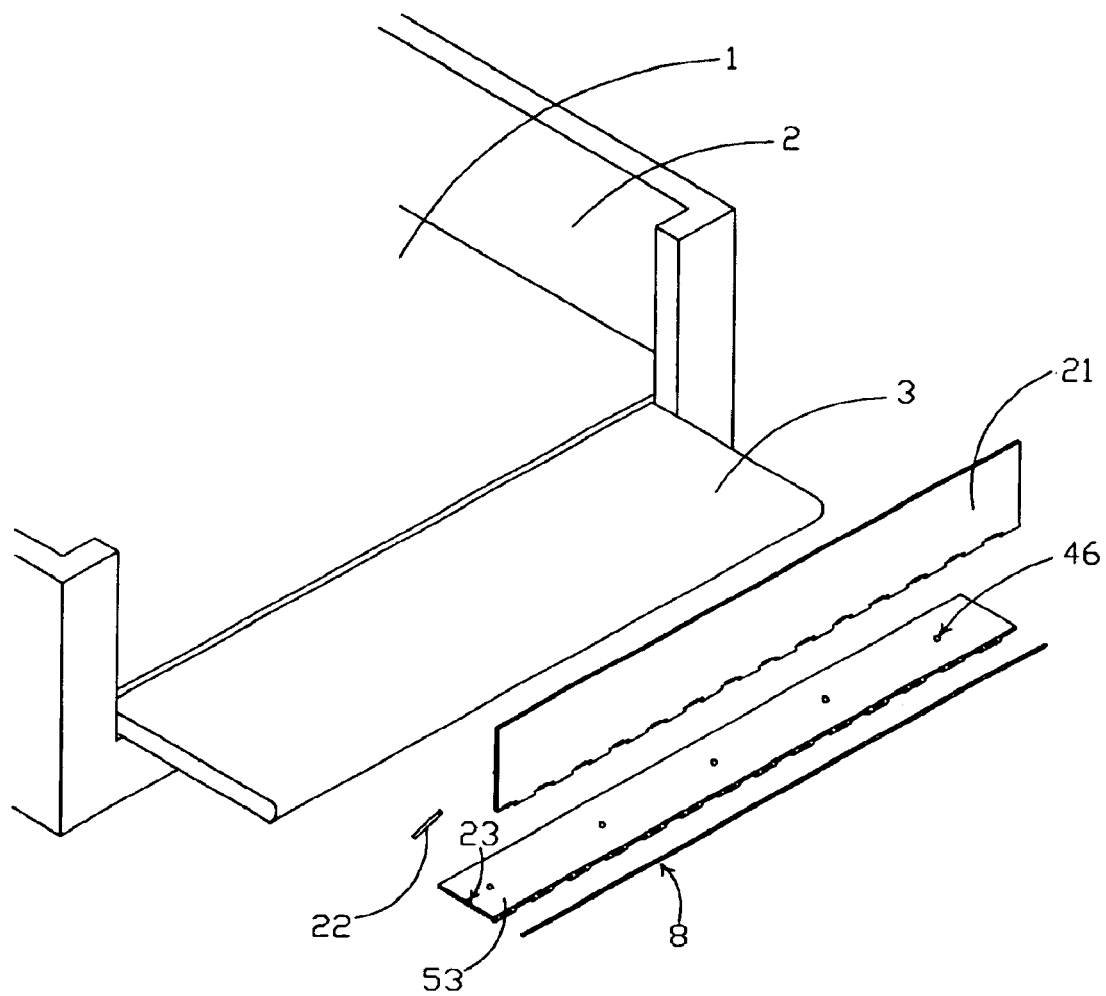
FIG. 4 shows an exploded isometric rear view of a portion of a primary tailgate (3) in the horizontal open position, and showing how a Retractable Stop may be assembled and affixed onto a primary tailgate (3). The mounting screws (41) are not shown in this drawing figure.

The mounting screw (41) is the screw, bolt, rivet, or the like, that may be used to fit through a mounting screw port (46) to attach the second piece of a hinge (20) or a two-piece hinge (40), or mounting plate (53) to a primary tailgate (3), as shown in FIG. 4, or to a back panel (4).

The reflector (43) is the one or more reflectors or reflector strips the may be attached or affixed to the Retractable Stop or the back panel (4 or 5), and are a safety feature located on the rear side, and would be visible from behind the truck, when the Retractable Stop or the back panel (4 or 5) is in the vertical up position, as shown in FIG. 28.

The mounting rivet (44) is the rivet, screw, bolt and nut, or other fastening means used to attach or affix a simple planar embodiment of the extended arm (21) to one of the hinges (41) in the two piece hinge (41) used for attaching some embodiments of the Retractable Stop to the primary tailgate (3) or the like, as shown in FIG. 11.

The mounting screw port (46) is the port, hole, orifice, or the like, located on a hinge (12, 20, 40) or mounting plate (53), that receives a mounting screw (41), thereby affixing the hinge to a back panel (4) or a primary tailgate (3).

The handle recessed area (47) is the optional recessed area or sink located on the primary tailgate (3), which allows the user to insert their fingers to get an optimal hold of the back panel, as shown in the various embodiments illustrated in the drawing figures.

The hinge rib (50) is the one or more ribs, bumps, or the like, that are located on the first piece of a specialized hinge (20) or two-piece hinge (40). The hinge rib (50) is located on the first hinge piece so that the hinge rib (50) will matedly meet the hinge rib restraint (51) when the specialized two-piece hinge is engaged into the open position, and generally between 90-degrees and 120-degrees, in the embodiments disclosed herein. The hinge rib (50) may be manufactured as part of the specialized hinge (20) or two-piece hinge (40), or alternatively, the hinge rib (50) may be added at a later time by welding or gluing, or other means. This hinge embodiment is a new and useful component devised, invented, and engineered by Mark Willard Vejnar.

The hinge rib restraint (51) is the one or more ribs, bumps, or the like, that are located on the second piece of a two-piece hinge. The hinge rib restraint (51) is located on the second hinge piece so that the hinge rib restraint (51) will matedly meet the hinge rib (50) when the specialized two-piece hinge is engaged into the open position, and generally between 90-degrees and 120-degrees, in the embodiments disclosed herein. The hinge rib restraint (51) may be manufactured as part of the specialized hinge (20) or two-piece hinge (40), or alternatively, the hinge rib restraint (51) may be added at a later time by welding or gluing, or other means. This hinge embodiment is a new and useful component devised, invented, and engineered by Mark Willard Vejnar.

The tailgate hinge (52) is the hinge, or the like, that affixes the primary tailgate (3) to the truck bed wall (2) or the truck bed (1), depending upon the tailgate design. The mounting plate (53) is plate, panel, or the like that has a hinge (20) or the like along one of its longest edges, and said hinge (20) is matedly attached to the extended arm (19) with a hinge pin (8). The mounting plate (53) is generally perforated with a plurality of holes, orifices, or ports, or the like to accommodate mounting screws (41), used to affix said plate to the desired surface.

The alignment tongue (54) is the tongue, arm, or the like, that extends beyond the mounting plate (53), and may be matedly fit into an alignment tongue port (55), to align and lock the mounting plate (53) of a Retractable Stop into place on a primary tailgate (3), as shown in FIGS. 19, 20, 22, and 23.

The alignment tongue port (55) is the port, hole, or the like, which matedly receives an alignment tongue (54), to align and lock the mounting plate (53) of a Retractable Stop into position on a primary tailgate (3), as shown in FIGS. 19, 20, 22, and 23.

The primary dimple (56) is the dimple, protrusion, or raised area, typically located along the lower portion of the rear surface of the extended arm (21), to matedly fit into a primary dimple port (57), and thereby lock the extended arm (21) into place, as shown in FIGS. 18 and 20. The above-described positions of the primary dimples (56) and its related primary dimple ports (57) may alternatively be reversed, as shown in FIGS. 22 and 23.

The primary dimple port (57) is the port, hole, pit, or the like, typically located along the rear edge of the recessed area, as shown in FIG. 19, to matedly receive a primary dimple (56), and thereby lock the extended arm (21) into place, as shown in FIG. 18. The above-described positions of the primary dimple ports (57) and its related primary dimples (56) may alternatively be reversed, as shown in FIGS. 22 and 23.

The secondary dimple (58) is the dimple, protrusion, or raised area, typically located along the top edge of the back panel (4) to each matedly fit into a secondary dimple port (59), located along the front edge of the recessed area, as shown in FIGS. 19 and 20. The above-described positions of the secondary dimples (58) and its related secondary dimple ports (59) may alternatively be reversed, as shown in FIG. 23.

The secondary dimple port (59) is the port, hole, pit, or the like, typically located along the front edge of the recessed area to matedly receive a secondary dimple (58), located along the top edge of the tailgate, as shown in FIG. 20. The above-described positions of the secondary dimple ports (59) and its related secondary dimples (58) may alternatively be reversed, as shown in FIGS. 22 and 23.

The hinge dimple (65) is the dimple, protrusion, or raised area, located on the hinge rib extension (66), as shown on FIGS. 26 and 27. A hinge rib extension (66) would optimally have one hinge dimple (65) located on each of the two opposing sides that are hidden from view when the hinge (7, 20, 40) is in the open position and the hinge rib (50) is matedly adjacent to the hinge rib restraint (51).

The hinge rib extension (66) is the extension, arm, or protrusion, extending from the hinge rib (50), and matedly fitting into a rib extension port (67), as shown in FIGS. 26 and 27. The hinge rib extension (66) would matedly fit into the rib extension port (67), when the hinge rib (50) is matedly adjacent to the hinge rib restraint (51).

The rib extension port (67) is the port, hole, or cavity located on the hinge rib restraint (51), that matedly receives the hinge rib extension (66), and has one or more hinge dimple ports (68) located on each of two opposing sides that are hidden from view when the hinge (7, 20, 40) is in the open position and the hinge rib (50) is matedly adjacent to the hinge rib restraint (51).

The hinge dimple port (68) is the port, hole, cavity, located on each of two opposing sides of the rib extension port, and each hinge dimple port (68) would matedly receive a hinge dimple (65), when the hinge is in the open position, and the hinge rib (50) is matedly adjacent to the hinge rib restraint (51).

DETAILED DESCRIPTION OF THE RETRACTABLE STOP EMBODIMENTS

The Retractable Stop is a panel, arm, obstacle, stop, or stopping means that may be engaged or disengaged by a retracting means about the axis of its retractable stop hinge (20 or 40), and extends along most of the width of the primary tailgate (3) or alternatively, at or near the top back panel edge (19) of an auxiliary tailgate. The retracting means is preferred to be manual, and with a retractable stop hinge (20), a plurality of two-piece hinges (40), or the like located along the axial length of the Retractable Stop. Once engaged, a simple embodiment of the Retractable Stop would remain in place due to gravitational action on its geometric design, as shown in FIG. 28, or would remain in place through the use of a new and useful retractable stop hinge (20) that would stop or lock at approximately 90-degrees or another desired angle, through the use of a hinge rib (50) and a hinge rib restraint (51), when the Retractable Stop is in the open position, as shown in FIGS. 24, 25, and 16. This new and useful restraining hinge (20) was devised, invented, and engineered by Mark Willard Vejner. The Retractable Stop may also be held into position with a hinged tongue (22) and a hinged tongue port (23), as shown in FIGS. 5–7. The retractable stop hinge (20) may run along the length of the Retractable Stop, and would allow the Retractable Stop to rotate about one axis. The geometric design of the Retractable Stop with the hinge rib (50) and hinge rib restraint (51) would give said Stop stability and strength to resist the force of a load, when in the open or engaged position, and when in the closed position, because of its essentially cylindrical shape around the hinged axis of rotation, and its hinged rib restraint (51) that matedly lines-up to the hinge rib (50) and are held together by gravitation or through the use of anther means such as a snap or magnetic means where a North pole of a magnet on one hinge part (e.g., 50 or 51) would be adjacent to the South pole of a magnet of the part's mate (50 or 51).

Figure 1:
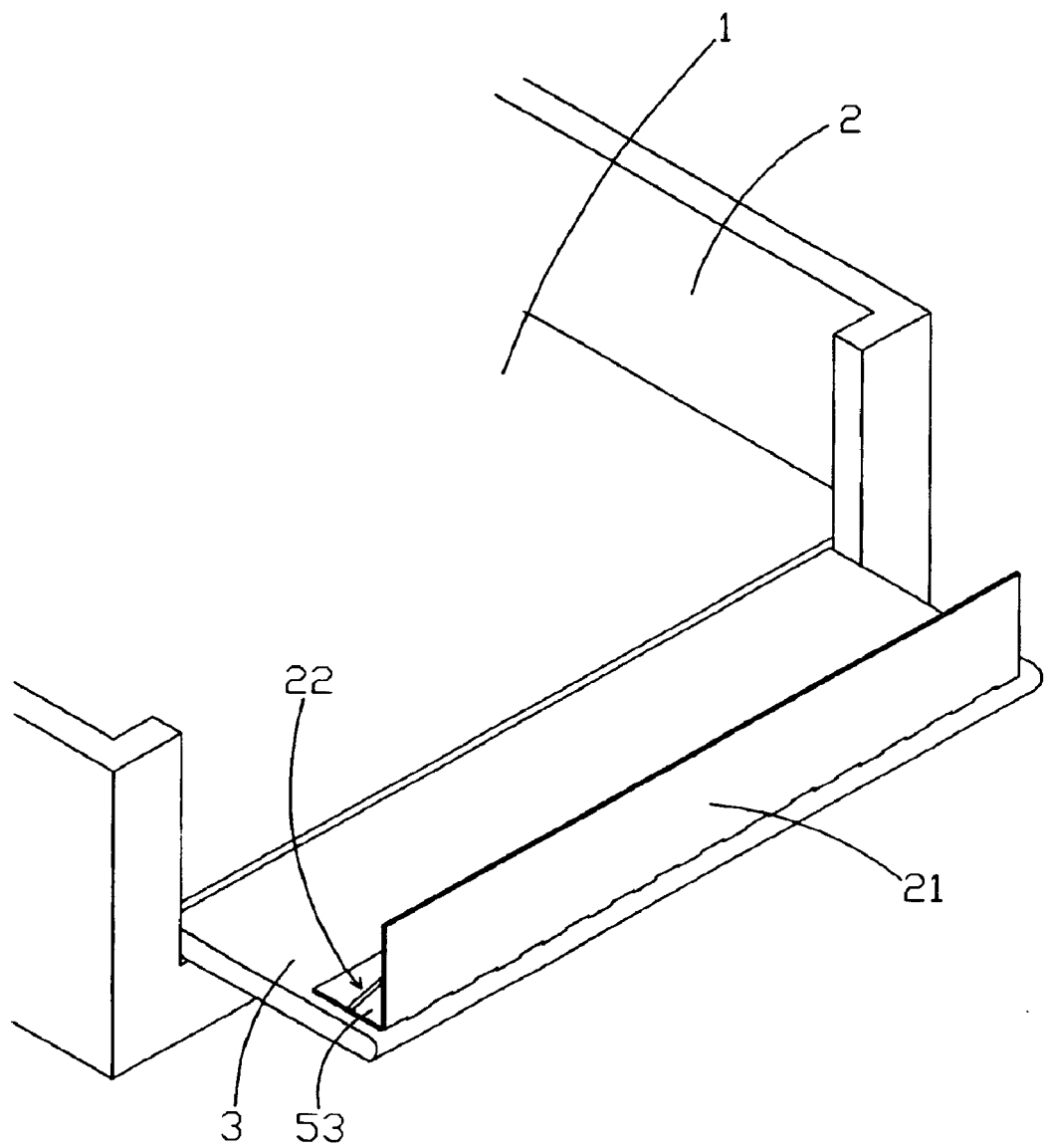
FIG. 1 shows an isometric rear view of a truck with a Retractable Stop attached thereto, and showing the primary tailgate (3) in the horizontal open position, and an attached Retractable Stop in the vertical open position, and utilizing a hinged tongue (22) as the locking means for the Retractable Stop.
Figure 2:
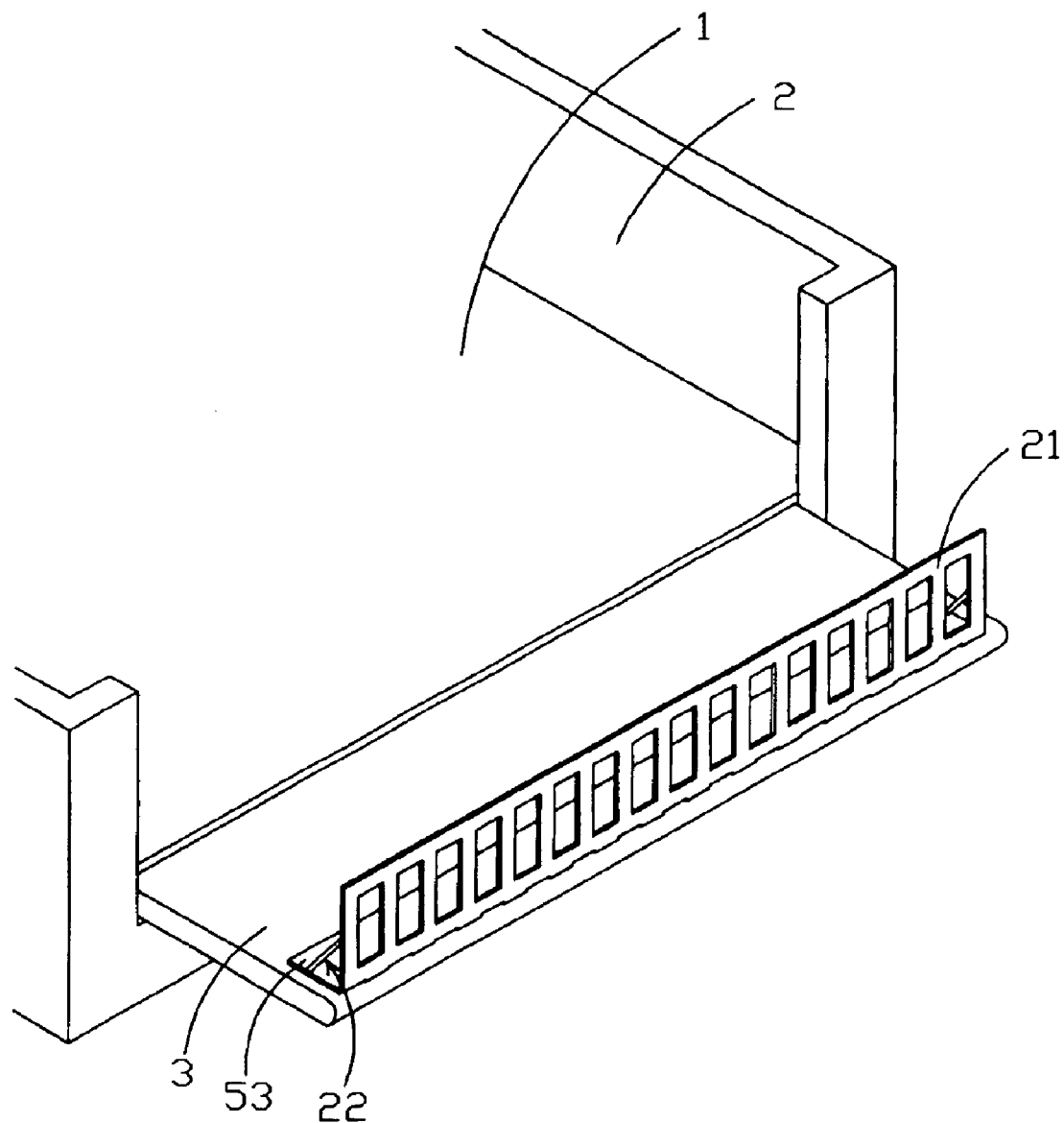
FIG. 2 shows an isometric rear view of a truck with an auxiliary tailgate attached thereto, and showing the primary tailgate (3) in the horizontal open position, and an attached open frame Retractable Stop in the vertical open position, and utilizing a hinged tongue (22) as the locking means for the Retractable Stop.

A modified embodiment of the extended arm (21) may be designed so that the base of the extended arm (21) effectively rests on a surface of the back panel (4) or the primary tailgate (3), with gravitational action keeping the Retractable Stop in the open position, once the Retractable Stop is placed in the open position, as shown in FIG. 28. The geometric shape of the extended arm (21) may vary according to the design needs of the application, and may be, for example, between a couple of inches to a foot or more high, when in the open position. The location of the Retractable Stop may be affixed near the top edge of the primary tailgate (3) or alternatively, near the top back panel edge (19) or on said edge (19), as shown in FIGS. 1, 28, and 17, respectively. Some other embodiments of the Retractable Stop may have the Retractable Stop affixed near the top portion of the front side of the primary tailgate (3), as shown in FIGS. 1 and 2, and in possible kit embodiments of the Retractable Stop, as may be derived from FIGS. 4, 10, and 11

There is another embodiment of the Retractable Stop that utilizes a locking means to keep the Retractable Stop in the 90-degree position, once it is opened to that position. This embodiment, shown in FIGS. 26 and 27, utilizes a new and useful locking hinge (20), devised, invented, and engineered by Mark Willard Vejnar. This locking hinge (20) is similar to that disclosed above, utilizing a hinge rib (50) and a hinge rib restraint (51), but would be further comprised of a hinge rib extension (66) protruding from the hinge rib (50), as shown in FIG. 26 and 27, and a rib extension port (67) extending into the hinge rib restraint (51), such that the hinge rib extension (66) may matedly fit into the rib extension port (67). The hinge rib extension (66) may have one or more hinge dimples (65) located on one or more sides of the hinge rib extension (66), such that each hinge dimple (65) matedly fits or snaps into a hinge dimple port (68) that is located on the wall of the rib extension port (67), as shown in FIGS. 26 and 27. The two locking means for these embodiments of the Retractable Stop are the hinge rib (50) resting on the rib hinge restraint (51), thereby effecting a first locking means when opening the hinge (2) to the desired angle on the hinge (20), and the second locking means being the one or more hinge dimples (65) each matedly fitting or snapping into the one or more hinge dimple ports (68), thereby effecting a second locking means which keeps the extended arm (21) of the Retractable Stop in the open position until the hinge dimple (65) is removed from the hinge dimple port (68), thereby loosening the extended arm (21) from the hinge dimple (65)/hinge dimple port (68) mating. The use of this new and useful locking hinge (20), as shown in FIGS. 26 and 27, may also be utilized in the various embodiments, and modified embodiments of the Auxiliary Tailgate, disclosed herein.

A preferred embodiment of the Retractable Stop would be comprised essentially the Retractable Stop disclosed above, and would additionally have a locking means or the like, to lock or affix the Retractable Stop in the open position and prevent it from accidentally closing during use. An example of such a locking means would be the use of one or more hinged tongues (22) that may be affixed to one or both ends of the body of the Retractable Stop, and said hinged tongues (22) would be utilized by rotating them to matedly fit into their respective hinged tongue ports (23) located on the front side of the primary tailgate (3) or alternatively, on the front side of the back panel (4), when the Retractable Stop is in the vertical open position, as shown in FIGS. 5–9.

A second preferred embodiment of the Retractable Stop using one or more hinged tongues (22) would have the hinged tongues (22) located and affixed near one or both ends of the primary tailgate (3) or alternatively, near one or both ends of the back panel (4), and said hinged tongues would be utilized by rotating them to matedly fit into their respective hinged tongue ports (23) located on the front side of the Retractable Stop, when the Retractable Stop is in the vertical open position, as shown in FIGS. 6 and 7.

A third set of preferred embodiments of the Retractable Stop would utilized a new and useful hinge means, devised, invented and design engineered by Mark Willard Vejnar, where the retractable stop hinge (20) or a two-piece hinge (40) would stop or lock at approximately 90-degrees or another desired angle, through the use of a hinge rib (50) and a hinge rib restraint (51), when the Retractable Stop is in the vertical open position, as shown in FIGS. 16, 24, and 25.

There is also a set of modified embodiments of the Retractable Stop, where a new and useful hinge may be used, and said hinge was devised, invented, and design engineered by Mark Willard Vejnar. This hinge is comprised essentially of a hinge (20) or two-piece hinge (40), with one or more holes or orifices around the curved surface of the hinge pin port (9). A peg, dowel, or the like may be inserted into one of said holes, thereby causing the hinge (20 or 40) to stop when opened to and one side of the hinge meets said peg or dowel. One side of the hinge (20 or 40) may comprise the mounting plate (53) of the Retractable Stop, and the other side of the hinge (20 or 40) may comprise the extended arm (21) or may be attached to the extended arm (21). This modified embodiment of the Retractable Stop was devised, invented and design engineered by Mark Willard Vejnar, and may be attached to the top back panel edge (19), top edge of the primary tailgate (3), or near the top of the front side of either the primary tailgate (3) or the back panel (4). An advantage of this embodiment of the Retractable Stop is that it allows the modification of a standard primary tailgate (3), with the screw-fitting attachment of the Retractable Stop, that the hinge (20 or 40) may be drilled or pierced to accommodate the peg or dowel. This modified embodiment of the Retractable Stop may be manufactured and marketed as an add-on kit, where the Retractable Stop may easily be added to a standard primary tailgate (3) with a plurality of mounting screws (41) or the like, similar to the embodiments shown in FIGS. 10, 11, and 17. An open frame Retractable Stop is shown in FIG. 2, where the extended arm (21) is comprised of an open frame body. The simple Retractable Stop embodiments, shown in FIGS. 10, 11, and 17, have one or more two-piece hinges (40), with where one of said two pieces of the hinge (40) attached or affixed to the primary tailgate (3), and the other end is attached by mounting rivets (44) to the extended arm (21), and may also be manufactured and marketed as an add-on kit.

A reflector (43) may be added to the back of any of the above embodiments of the Retractable Stop, as well as to the back of an auxiliary tailgate's back panel (4, 5) as a safety feature, as shown in FIG. 28.

The retractable stop hinge (20), the two piece hinge (40), the mounting screws and rivets (41, 44), the mounting plate (53), and the extended arm (21) of the Retractable Stop may be composed essentially of a metal, alloy, polymeric, or composite material, or a combination thereof A simple kit embodiment of the Retractable Stop would utilize a polymeric mounting plate (53) and extended arm (21), and a plurality of two piece metal or alloy hinges (40) with metal or alloy mounting screws and rivets (41, 44). The metal or alloy hinges (40) and the mounting plate (53) and the extended arm (21), whether composed-essentially of a metal, alloy, or a polymeric material, may optionally be coated or sprayed with a polyurethane based foam or the like, or may be coated or sprayed with another polymeric or composite material, which hardens to the desired strength, texture, and coloration for the components coated. An example of two commercially available polyurethane based foam-coatings includes LINE-X or RHINO. This coating may provide the user of the Retractable Stop with a layer of protection for the paint on the surface of the truck's tailgate (3).

A preferred kit embodiment of the Retractable Stop would utilize a polycarbonate mounting plate (52) and extended arm (21), a polycarbonate or a coated metal or alloy hinge (20), and metal or alloy mounting screws and rivets (41, 44), and a plurality of attachable reflectors (43).

Drawing FIGS. 1–17, 24, 25, 28, and 29 show various embodiments of the Retractable Stop. Hybrid and composite embodiments may be derived from the drawing figures and the specification by addition, elimination, and replacement of components, and would be combinatorial and numerous, but are also intended to be included in the present invention.

In short, a set of simple embodiments of the Retractable Stop may be comprised essentially of a mounting plate (53) extending across a portion of the width of a primary tailgate (3) and affixed to said primary tailgate (3) with a first half of a retractable stop hinge (20) located along one side of said mounting plate (53), and a second half of said retractable stop hinge (20) located along one side of an extended arm (21). Said first half of retractable stop hinge (20) has a hinge pin port (9) located along the hinge (20) and said second half of retractable stop hinge (20) has a hinge pin port (9) located along the hinge (20), and said first half of retractable stop hinge (20) and said second half of retractable stop hinge (20) are joined together such that their hinge pin ports (9) form a common hinge pin port (9). A hinge pin (8) is then passed through said common hinge pin port (9) thereby affixing the mounting plate (53) to said extended arm (21), and said mounting plate (53) affixed to the primary tailgate (3). Said retractable stop hinge (20) provides an axis of rotation for the extended arm (21), and said axis of rotation terminates at one of two ends of an arc, and with the extended arm in the horizontal closed position at one end, and in the vertical open position at the other end of said arc. Some embodiments of the Retractable Stop may further include a plurality of mounting screw ports (46) located on the mounting plate (53), for affixing said mounting plate (53) to the primary tailgate (3). The Retractable Stop locking means may include a hinged tongue (22) attached to the extended arm (21), a hinged tongue (22) attached to the mounting plate (53), or a hinge rib (50) and hinge rib restraint (51) locking means. The hinge rib (50) and hinge rib restraint (51) locking means has said second half of retractable stop hinge (20) has a hinge rib (50) located thereon, and said first half of retractable stop hinge (20) has a hinge rib restraint (51) located thereon. This locking means is preferred when said hinge rib (50) has a hinge rib extension (66) located thereon, and said hinge rib restraint (51) has a rib extension port (67) located thereon, to receive said hinge rib extension (66), when the retractable stop hinge (20) is extended to the open position. The Retractable Stop embodiments may have a recessed area (16), located in the front surface of the primary tailgate (3), and recessed to hold the mounting plate (53), and to receive the extended arm (21), when said extended arm (21) is rotated about the axis of said common hinge pin port (9), and into said recessed area (16).

Another set of embodiments for the Retractable Stop includes kit embodiments, where the Retractable Stop is packaged in an unassembled, partially assembled, or pre-assembled form, for sale to a prospective user or installer, and final assembly is completed and the Retractable Stop is then installed on the appropriate area of a truck or the like. Such a Retractable Stop kit may be comprised essentially of a mounting plate (53) with a plurality of mounting screw ports (46) located thereon, and with a first half of a retractable stop hinge (20) located along one side of said mounting plate (53), and an extended arm (21) with a second half of said retractable stop hinge (20) located along one side of said extended arm (21). There is also a hinge pin (8), for matedly attaching said first half of a retractable stop hinge (20) with said second half of said retractable stop hinge (20), a plurality of mounting screws (41), and optionally a hinged tongue (22) and hinged tongue port (23) located on the mounting plate (53). The Retractable Stop kit may alternatively use another locking means, such as a hinge rib (50) located on said second half of the retractable stop hinge (20), and a hinge rib restraint (51) located on said first half of the retractable stop hinge (20). This locking means is preferred when said hinge rib (50) has a hinge rib extension (66) located thereon, and said hinge rib restraint (51) has a rib extension port (67) located thereon, to receive said hinge rib extension (66), when the retractable stop hinge (20) is extended to the vertical open position.

The Retractable Stop may be composed essentially of a metal, alloy, polymeric, or composite material, or a combination thereof, and it may be coated with a polyurethane foam, or another material for aesthetic purposes and to afford additional safety to the paint surface of the truck's primary tailgate (3). The Retractable Stop may be a solid body or an open frame Stop. Hybrid and composite embodiments may be derived from the drawing figures and specification by addition, elimination, and replacement of components, and would be combinatorial and numerous, but are also intended to reflect the present invention.

Some Modified Embodiments of the Retractable Stop

There are other modified embodiments of the Retractable Stop, which may be fit or press-fit onto the primary tailgate (3), as shown in FIGS. 18–23, or onto an auxiliary tailgate's back panel (4).

The Retractable Stop may be affixed to the primary tailgate (3) by snapping or press-fitting the mounting plate (53), as shown in FIGS. 18–23, or alternatively, the mounting side or piece of a two-piece hinge (40) from a Retractable Stop, into a pre-formed recessed area (16) on the front side of the primary tailgate (3), thereby affixing the Retractable Stop to the primary tailgate (3). This recessed area (16) may include a handle recessed area (47) to allow the user to easily access the extended arm (21), and utilize it like a handle to move the Retractable Stop to the vertical open or the horizontal closed positions. The Retractable Stop may, for example, use an alignment tongue (54) and an alignment tongue port (55), to better secure the Retractable Stop into the body of the primary tailgate (3), and may utilize a plurality mounting screws (41 ) each passing through their respective mounting screw port (46), to affix the mounting plate (53) onto the primary tailgate (3), as shown in FIGS. 19 and 20. The recessed area (16) on the front side of the primary tailgate (3) for housing the Retractable Stop may also function as a restraint or barrier when the extended arm (21) portion of the Retractable Stop is in the vertical open position, restraining or stopping the extended arm (21) at the desired angle, such as approximately 90-degrees, when opened to said vertical open position. Said desired angle may be slightly greater than 90-degrees to further utilize the effects of gravity to keep the extended arm (21) in the vertical open position. There may also be one or more primary dimples (56) located along the lower portion of the rear surface of the extended arm (21) to each matedly fit into a primary dimple port (57), located along the rear edge of the recessed area (16), as shown in FIGS. 19–21. When a primary dimple (56) fits or snaps into a primary dimple port (57), the extended arm (21) is effectively locked into the open position, as shown in FIG. 18, until one manually rotates the extended arm (21) along its retractable stop hinge (20) axis, to another desired position, such as the closed position, as shown in FIG. 21. There may also be one or more secondary dimples (58) located along top edge of the extended arm (21) to each matedly fit into a secondary dimple port (59), located along the front edge of the recessed area (16), as shown in FIGS. 19 and 20. When a secondary dimple (58) fits or snaps into a secondary dimple port (59), the extended arm (21) is effectively locked into the horizontal closed position, as shown in FIG. 21, until one manually rotates the extended arm (21) along its retractable stop hinge (20) axis, to another desired position, such as the vertical open, 90-degree position, similar to that shown in FIG. 18. The aforementioned dimples (56 and 58) may optionally be spring-loaded or composed essentially of an elastomeric or flexible material. A modification of the aforementioned embodiment, shown in FIGS. 19 and 20, would have location of the dimples (56 and 58) reversed with the location of the dimple ports (57 and 59), as shown in FIGS. 22 and 23. In FIGS. 22 and 23, it should be noted that the primary dimple ports (57) are located along the lower portion of the rear surface of the extended arm (21) to each matedly receive a primary dimple (56), located along the rear edge of the recessed area. When a primary dimple port (57) fits or snaps over a primary dimple (56), the extended arm (21) is effectively locked into the open position, similar to that shown in FIG. 18, until one manually rotates the extended arm (21) along its retractable stop hinge (20) axis, to another desired position, such as the horizontal closed position, similar to that shown in FIG. 21. There may also be one or more secondary dimple ports (59) located along the top edge of the extended arm (21) to each matedly receive a secondary dimple (58), located along the front edge of the recessed area, as shown in FIG. 22. When a secondary dimple port (59) fits or snaps onto a secondary dimple (58), the extended arm (21) is effectively locked into the closed position, similar to that shown in FIG. 21, until one manually rotates the extended arm (21) along its horizontal back panel hinge (7) axis, to another desired position, such as the 90-degree vertical open position. Other embodiments of the Retractable Stop may also include kits, including partially-assembled kit embodiments, which are comprised essentially of the components utilized in the various above-described embodiments of the Retractable Stop, and the auxiliary tailgate with a Retractable Stop, but are packaged and marketed as a kit or the like, to be added onto an existing truck.

While I have shown and described in this disclosure and its appended drawing figures, and which are a part of and incorporated in said disclosure, only selected embodiments in accordance with the present invention, it is understood that the same is not limited thereto, but is susceptible to numerous changes and modifications as known to one having ordinary skill in the art, and I therefore do not wish to be limited to the details shown and described herein, but intend to cover all such modifications, changes, eliminations, combinations and hybrids, as are encompassed by the scope of the appended claims.

I claim:

1. A Retractable Stop comprised essentially of:
   a. a mounting plate extending across a portion of the width of a primary tailgate, and affixed to said primary tailgate;
   b. a first half of a retractable stop hinge located along one side of said mounting plate;
   c. and a second half of said retractable stop hinge located along one side of an extended arm;
   d. said first half of retractable stop hinge has a hinge pin port located along the hinge and said second half of retractable stop hinge has a hinge gin port located along the hinge;
   e. said first half of retractable stop hinge and said second half of retractable stop hinge are joined together such that their hinge on ports form a common hinge pin port, and a hinge pin is passed through said common hinge pin port, thereby affixing the mounting plate to said extended arm, and said mounting plate affixed to the primary tailgate;
   f. said second half of retractable stop hinge has a hinge rib located thereon;
   g. said first half of retractable stop hinge has a hinge rib restraint located thereon;
   h. said hinge rib has a hinge rib extension located thereon;
   i. said hinge rib restraint has a rib extension port located thereon, to receive said hinge rib extension, when the retractable stop hinge is extended to the open position;
   j. said hinge rib extension has a primary dimple located thereon; and
   k. said rib extension port has a primary dimple port located thereon.

2. A Retractable Stop comprised essentially of:
   a. a mounting plate extending across a portion of the width of a primary tailgate, and affixed to said primary tailgate;
   b. a first half of a retractable stop hinge located along one side of said mounting plate;
   c. and a second half of said retractable stop hinge located along one side of an extended arm;
   d. said first half of retractable stop hinge has a hinge pin port located along the hinge and said second half of retractable stop hinge has a hinge pin port located along the hinge;
   e. said first half of retractable stop hinge and said second half of retractable stop hinge are joined together such that their hinge pin ports form a common hinge pin port, and a hinge pin is passed through said common hinge pin port, thereby affixing the mounting plate to said extended arm, and said mounting plate affixed to the primary tailgate;
   f. said second half of retractable stop hinge has a hinge rib located thereon;
   g. said first half of retractable stop hinge has a hinge rib restraint located thereon;
   h. said hinge rib has a hinge rib extension located thereon;
   i. said hinge rib restraint has a rib extension port located thereon, to receive said hinge rib extension, when the retractable stop hinge is extended to the open position;
   j. said hinge rib extension has a primary dimples located thereon; and
   k. said rib extension port has a primary dimple ports located thereon.

3. A truck having a Retractable Stop comprised essentially of:
   a. a mounting plate extending across a portion of the width of a primary tailgate, and affixed to said primary tailgate, of said truck;
   b. a first half of a retractable stop hinge located along one side of said mounting plate;
   c. and a second half of said retractable stop hinge located along one side of an extended arm;
   d. said first half of retractable stop hinge has a hinge pin port located along the hinge and said second half of retractable stop hinge has a hinge pin port located along the hinge;
   e. said first half of retractable stop hinge and said second half of retractable stop hinge are joined together such that their hinge pin ports form a common hinge pin port, and a hinge is passed through said common hinge pin port, thereby affixing the mounting plate to said extended arm, and said mounting plate affixed to the primary tailgate;
   f. said second half of retractable stop hinge has a hinge rib located thereon;
   g. said first half of retractable stop hinge has a hinge rib restraint located thereon, and on the truck;
   h. said hinge rib has a hinge rib extension located thereon;
   i. said hinge rib restraint has a rib extension port located thereon, to receive said hinge rib extension, when the retractable stop hinge is extended to the open position, on the truck;
   j. a primary dimple located on said hinge rib extension, on the truck; and
   k. a primary dimple port located on said rib extension port.

4. A truck having a Retractable Stop comprised essentially of:
   a. a mounting plate extending across a portion of the width of a primary tailgate, and affixed to said primary tailgate, of said truck;
   b. a first half of a retractable stop hinge located along one side of said mounting plate;
   c. and a second half of said retractable stop hinge located along one side of an extended arm;
   d. said first half of retractable stop hinge has a hinge pin port located along the hinge and said second half of retractable stop hinge has a hinge pin port located along the hinge;

e. said first half of retractable stop hinge and said second half of retractable stop hinge are joined together such that their hinge pin ports form a common hinge pin port, and a hinge pin is passed through said common hinge pin port, thereby affixing the mounting plate to said extended arm, and said mounting plate affixed to the primary tailgate;

f. said second half of retractable stop hinge has a hinge rib located thereon;

g. said first half of retractable stop hinge has a hinge rib restraint located thereon, and on the truck;

h. said hinge rib has a hinge rib extension located thereon;

i. said hinge rib restraint has a rib extension port located thereon, to receive said hinge rib extension, when the retractable stop hinge is extended to the open position, on the truck;

j. a plurality of primary dimples located on said hinge rib extension, on the truck; and k. a plurality of primary dimple ports located on said rib extension port.

5. A truck having a Retractable Stop comprised essentially of:

a. a mounting plate extending across a portion of the width of a primary tailgate, and affixed to said primary tailgate, of said truck;

b. a first half of a retractable stop hinge located along one side of said mounting plate;

c. and a second half of said retractable stop hinge located along one side of an extended arm;

d. said first half of retractable stop hinge has a hinge pin port located along the hinge and said second half of retractable stop hinge has a hinge pin port located along the hinge;

e. said first half of retractable stop hinge and said second half of retractable stop hinge are joined together such that their hinge pin ports form a common hinge pin port, and a hinge pin is passed through said common hinge pin port, thereby affixing the mounting plate to said extended arm, and said mounting plate affixed to the primary tailgate;

f. said second half of retractable stop hinge has a hinge rib located thereon;

g. said first half of retractable stop hinge has a hinge rib restraint located thereon, and on the truck;

h. said hinge rib has a hinge rib extension located thereon;

i. said hinge rib restraint has a rib extension port located thereon, to receive said hinge rib extension, when the retractable stop hinge is extended to the open position, on the truck;

j. a primary dimple port located on said hinge rib extension, on the truck; and k. a primary dimple located on said rib extension port.

6. A truck having a Retractable Stop comprised essentially of:

a. a mounting plate extending across a portion of the width of a primary tailgate, and affixed to said primary tailgate, of said truck;

b. a first half of a retractable stop hinge located along one side of said mounting plate;

c. and a second half of said retractable stop hinge located along one side of an extended arm;

d. said first half of retractable stop hinge has a hinge pin port located along the hinge and said second half of retractable stop hinge has a hinge pin port located along the hinge;

e. said first half of retractable stop hinge and said second half of retractable stop hinge are joined together such that their hinge pin ports form a common hinge pin port, and a hinge pin is passed through said common hinge pin port, thereby affixing the mounting plate to said extended arm, and said mounting plate affixed to the primary tailgate;

f. said second half of retractable stop hinge has a hinge rib located thereon;

g. said first half of retractable stop hinge has a hinge rib restraint located thereon, and on the truck;

h. said hinge rib has a hinge rib extension located thereon;

i. said hinge rib restraint has a rib extension port located thereon, to receive said hinge rib extension, when the retractable stop hinge is extended to the open position, on the truck;

j. a plurality of primary dimple ports located on said hinge rib extension, on the truck; and k. a plurality of primary dimples located on said rib extension port.

7. A Retractable Stop comprised essentially of:

a. a mounting plate extending across a portion of the width of a primary tailgate, and affixed to said primary tailgate;

b. a first half of a retractable stop hinge located along one side of said mounting plate;

c. and a second half of said retractable stop hinge located along one side of an extended arm;

d. said first half of retractable stop hinge has a hinge pin port located along the hinge and said second half of retractable stop hinge has a hinge pin port located along the hinge;

e. said first half of retractable stop hinge and said second half of retractable stop hinge are joined together such that their hinge pin ports form a common hinge pin port, and a hinge pin is passed through said common hinge pin port, thereby affixing the mounting plate to said extended arm, and said mounting plate affixed to the primary tailgate;

f. said second half of retractable stop hinge has a hinge rib located thereon;

g. said first half of retractable stop hinge has a hinge rib restraint located thereon;

h. said hinge rib has a hinge rib extension located thereon;

i. said hinge rib restraint has a rib extension port located thereon, to receive said hinge rib extension, when the retractable stop hinge is extended to the open position;

j. said hinge rib extension has a primary dimple port located thereon; and k. said rib extension port has a primary dimple located thereon.

8. A Retractable Stop comprised essentially of:

a. a mounting plate extending across a portion of the width of a primary tailgate, and affixed to said primary tailgate;

b. a first half of a retractable stop hinge located along one side of said mounting plate;

c. and a second half of said retractable stop hinge located along one side of an extended arm;

d. said first half of retractable stop hinge has a hinge pin port located along the hinge and said second half of retractable stop hinge has a hinge pin port located along the hinge;

e. said first half of retractable stop hinge and said second half of retractable stop hinge are joined together such that their hinge pin ports form a common hinge pin port, and a hinge pin is passed through said common hinge pin port, thereby affixing the mounting plate to said extended arm, and said mounting plate affixed to the primary tailgate;

f. said second half of retractable stop hinge has a hinge rib located thereon;

g. said first half of retractable stop hinge has a hinge rib restraint located thereon;

h. said hinge rib has a hinge rib extension located thereon;

i. said hinge rib restraint has a rib extension port located thereon, to receive said hinge rib extension, when the retractable stop hinge is extended to the open position;

j. said hinge rib extension has a plurality of primary dimple ports located thereon; and k. said rib extension port has a plurality of primary dimples located thereon.

* * * * *